US010268840B2

(12) United States Patent
Lockhart, III et al.

(10) Patent No.: US 10,268,840 B2
(45) Date of Patent: Apr. 23, 2019

(54) SYSTEMS AND METHODS OF DETERMINING COMPROMISED IDENTITY INFORMATION

(71) Applicant: XOR Data Exchange, Inc., Wimberley, TX (US)

(72) Inventors: Lester Leland Lockhart, III, Austin, TX (US); David Hugh Munson, Waterville, ME (US); Gregor R Bonin, Austin, TX (US); Michael Cook, Wimberley, TX (US)

(73) Assignee: XOR Data Exchange, Inc., Wimberley, TX (US)

( * ) Notice: Subject to any disclaimer, the term of this patent is extended or adjusted under 35 U.S.C. 154(b) by 0 days.

(21) Appl. No.: 15/237,519

(22) Filed: Aug. 15, 2016

(65) Prior Publication Data

US 2017/0161520 A1   Jun. 8, 2017

Related U.S. Application Data

(63) Continuation-in-part of application No. 14/960,288, filed on Dec. 4, 2015.

(51) Int. Cl.
  *G06F 21/62* (2013.01)
  *H04L 29/06* (2006.01)
  *G06F 21/60* (2013.01)

(52) U.S. Cl.
  CPC ........ *G06F 21/6254* (2013.01); *G06F 21/602* (2013.01); *G06F 21/6263* (2013.01); *H04L 63/08* (2013.01); *H04L 63/10* (2013.01)

(58) Field of Classification Search
  CPC .................................................. G06F 21/6254
  See application file for complete search history.

(56) References Cited

U.S. PATENT DOCUMENTS

| 7,240,363 | B1 | 7/2007 | Ellingson |
| 7,617,393 | B2 | 11/2009 | Betz et al. |
| 7,676,834 | B2 | 3/2010 | Camaisa et al. |
| 7,870,608 | B2 | 1/2011 | Shraim et al. |

(Continued)

OTHER PUBLICATIONS

Romanosky et al., Do Data Breach Disclosure Laws Reduce Identity Theft?, Seventh Workshop on the Economics of Information Security, Dartmouth College, Hanover, NH, Jun. 25-28, 2008, 20 pages.

*Primary Examiner* — Kambiz Zand
*Assistant Examiner* — Thanh H Le
(74) *Attorney, Agent, or Firm* — Cesari & Reed, LLP; R. Michael Reed

(57) ABSTRACT

In some embodiments, a compromised data exchange system may include an interface configured to couple to a network, a processor, and a memory accessible to the processor. The memory may be configured to store instructions that, when executed, cause the processor to extract data from one or more websites using a crawler, detect portions within the data that resemble personally identifying information (PII) data based on PII data patterns using a risk assessment module, and to compare a detected portion to data within a database of disassociated compromised PII data to determine a match using the risk assessment module. The instructions may further cause the processor to selectively assign a risk score to a data item within the database in response to determining the match using a risk scoring module.

21 Claims, 11 Drawing Sheets

(56) References Cited

U.S. PATENT DOCUMENTS

| | | | |
|---|---|---|---|
| 7,913,302 B2 | 3/2011 | Shraim et al. | |
| 7,962,962 B2 | 6/2011 | Adler et al. | |
| 8,019,689 B1* | 9/2011 | Nachenberg | G06Q 10/063 |
| | | | 705/50 |
| 8,285,656 B1* | 10/2012 | Chang | G06N 5/02 |
| | | | 706/15 |
| 8,359,651 B1 | 1/2013 | Wu et al. | |
| 8,429,545 B2 | 4/2013 | Dixon et al. | |
| 8,561,185 B1* | 10/2013 | Muthusrinivasan | |
| | | | G06F 21/6245 |
| | | | 705/51 |
| 8,566,726 B2 | 10/2013 | Dixon et al. | |
| 8,683,031 B2 | 3/2014 | Green et al. | |
| 8,713,450 B2 | 4/2014 | Garbow et al. | |
| 8,752,181 B2 | 6/2014 | Grzymala-Busse et al. | |
| 8,875,284 B1 | 10/2014 | Newstadt et al. | |
| 9,172,706 B2 | 10/2015 | Krishnamurthy et al. | |
| 9,203,648 B2 | 12/2015 | Shraim et al. | |
| 2008/0147554 A1* | 6/2008 | Stevens | G06F 19/322 |
| | | | 705/51 |
| 2016/0012561 A1* | 1/2016 | Lappenbusch | G06Q 50/265 |
| | | | 705/31 |

* cited by examiner

SYSTEMS AND METHODS OF DETERMINING COMPROMISED IDENTITY INFORMATION

CROSS-REFERENCE TO RELATED APPLICATION(S)

The present disclosure is a continuation-in-part of and claims priority to co-pending application Ser. No. 14/960,288 filed on Dec. 4, 2015 and entitled "Compromised Identity Exchange Systems and Methods", which is incorporated herein by reference in its entirety.

FIELD

The present disclosure is generally related to identification of compromised identity information, and more particularly to system and methods of determining compromised personally identifiable information on the Internet.

BACKGROUND

Personally identifiable information (PII) may be collected by a variety of organizations, including healthcare organizations, governmental organizations, financial entities (e.g., credit card companies, banks, etc.), credit bureaus, educational institutions, and other organizations. PII includes information that can be used to uniquely identify an individual and may include, but is not limited to, the individual's full name, date of birth, social security number, bank or credit card numbers, passwords, addresses, phone numbers, and the like. Such data is increasingly maintained in electronic form, making it easier for such data to become compromised, such as through a hacking event, inadvertent disclosure, or other data breach incidents. Compromised PII data may be used for identify theft and for other nefarious purposes.

In addition to data breach events, PII can be compromised through "phishing", which refers to a process of masquerading as a trustworthy entity in an electronic communication. An example of phishing may include a fraudulent email that appears to be from a valid source, such as, for example, a national bank or a credit card company. The fraudulent email may incorporate a uniform resource locator (URL) that re-directs the user to a fraudulent website that masquerades as a legitimate website for the real company. However, the fraudulent website may be designed to steal PII via a false transaction. For example, the fraudulent website may request "confirmation" of PII, such as, for example, a credit card number or a username and password. The "confirmed" PII may then be stored for later improper use.

Once collected, PII data may be sold on a black market through various web sites and illicit data sources. Such web sites and data sources may not be registered with standard search engines, making them difficult to find through traditional web searches. Such web sites and data sources may be part of the "dark" web, which can be represented by a large number of web servers that do not permit search engine indexing and which host information for those who know where to look.

SUMMARY

In some embodiments, a system may be configured to identify PII data on various web sites based on data patterns. For example, entity names, social security numbers, email addresses, phone numbers, addresses, and other types of information are typically presented in a particular pattern, which pattern can be identified whether or not the information is labeled.

In some embodiments, the system may be configured to search one or more web sites for data patterns that resemble PII data and extract links from pages that include such data patterns. The system may then process the extracted links to extract and process the data to determine whether the data includes PII data. The scraped data may be provided to an Artificial Intelligence (AI) engine for processing against particular rules to verify PII data or may be elevated to an administrator for review. Confirmed PII data may be treated like compromised PII data, and may be disassociated before being added to a database of compromised PII data.

In some embodiments, the system may crawl one or more identified web sites to extract data. The system may process the extracted data, searching the extracted data to identify patterns representing portions of PII data. The scraped data may be provided to an Artificial Intelligence (AI) engine for processing against particular rules to verify PII data or may be elevated to an administrator for review. Confirmed PII data may be treated like compromised PII data, and may be disassociated before being added to a database of compromised PII data.

In certain embodiments, the system may compare the scraped data that resembles PII data to disassociated PII data (corresponding to a breach event) within a database. If a match is determined, the system may elevate a risk score associated with the particular piece of data (or with the breach event if more than one matching piece of PII data is determined).

In some embodiments, a compromised data exchange system may include an interface configured to couple to a network, a processor coupled to the interface, and a memory accessible to the processor. The memory may be configure to store instructions that, when executed, cause the processor to extract data from one or more websites using a crawler, detect portions within the data that resemble personally identifying information (PII) data based on PII data patterns using a risk assessment module, and compare a detected portion to data within a database of disassociated compromised PII data to determine a match using the risk assessment module. The instructions may further cause the processor to selectively assign a risk score to a data item within the database in response to determining the match using a risk scoring module.

In other embodiments, a computer-readable memory device may include instructions that, when executed, cause a processor to extract data from one or more websites using a crawler and detect portions within the data that resemble personally identifying information (PII) data based on PII data patterns using a risk assessment module. The computer-readable memory device may further include instructions that, when executed, cause the processor to compare a detected portion to data within a database of disassociated compromised PII data to determine a match using the risk assessment module and selectively assign a risk score to a data item within the database in response to determining the match using a risk scoring module. In certain embodiments, the computer-readable memory device may include a non-volatile memory, such as a flash memory, a hard disc drive, a compact disc (CD), another physical storage device, or any combination thereof.

In still other embodiments, a compromised data exchange system may include an interface configured to communicate with a network, a processor coupled to the interface, and a memory accessible to the processor. The memory may be configured to store instructions that, when executed, cause the processor to retrieve data from one or more websites according to a list of uniform resource locators (URLs) and process the retrieved data to identify portions that correspond to patterns that resemble personally identifying information (PII) data. The memory may further include instructions that, when executed, cause the processor to compare the identified portions to data stored in a database of compromised PII data to determine a match and update a risk score associated with a matching data item within the database of compromised PII data in response to determining the match.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
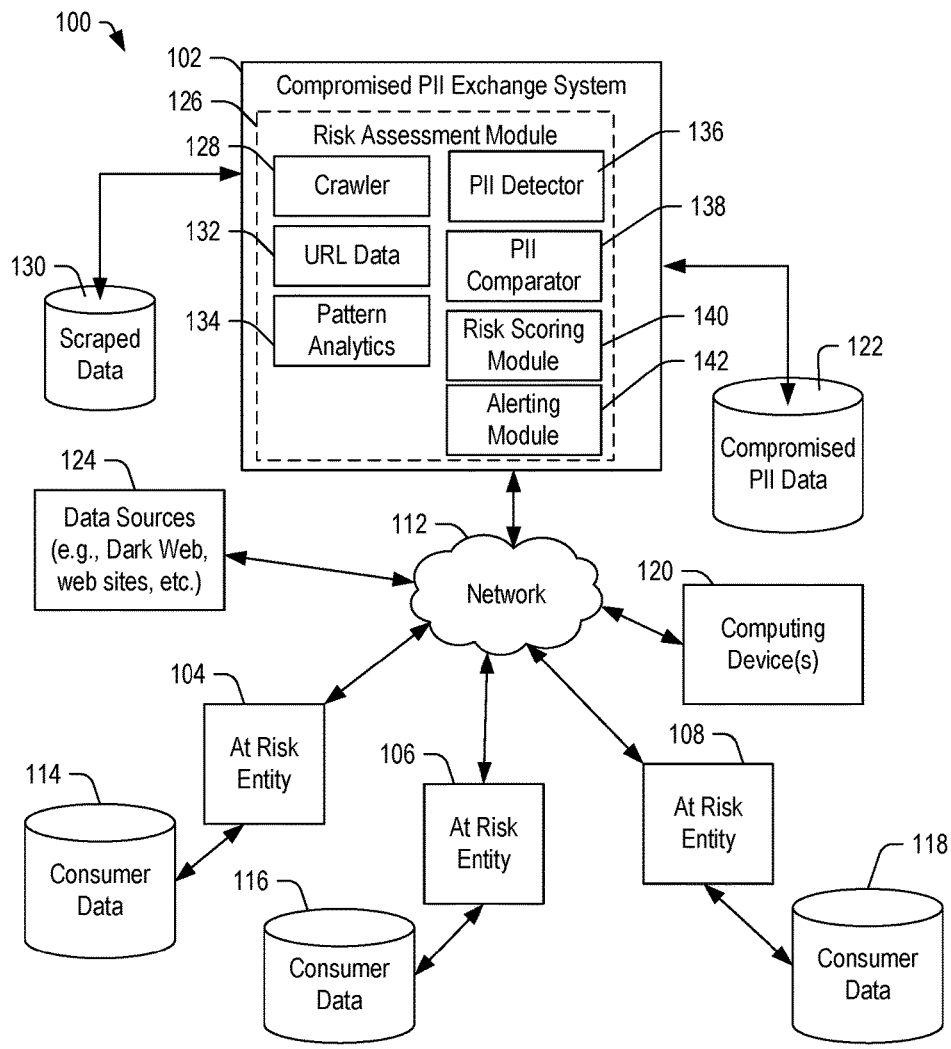
FIG. 1 depicts a block diagram of a compromised identity exchange system, in accordance with certain embodiments of the present disclosure.

In the following detailed description of embodiments, reference is made to the accompanying drawings which form a part hereof, and which are shown by way of illustrations. It is to be understood that features of various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with various embodiments, the methods and functions described herein may be implemented as one or more software programs running on a computing device, such as a tablet computer, smartphone, personal computer, server, or any other computing device. Dedicated hardware implementations including, but not limited to, application specific integrated circuits, programmable logic arrays, and other hardware devices can likewise be constructed to implement the methods and functions described herein. Further, the methods described herein may be implemented as a device, such as a computer readable storage medium or memory device, including instructions that when executed cause a processor to perform the methods.

Conventionally, in response to a breach of a company's data security, a press release may be issued, and affected customers may be notified. Sometimes, new credit cards or new credit card numbers are issued. However, in some instances, compromised data may be used by criminals to open new credit accounts or to attempt to gain access to a customer's account. In some instances, such as when a record keeper's records are compromised, a large amount of customer data, including multiple customer accounts, may be compromised. Data from such data breaches can end up being sold online through websites and private servers.

As used herein, the term "exposed data" or "compromised data" refers to any part of personally identifying information (PII) that may have been compromised or breached, such that an unauthorized individual may have gained access to such information. Further, as used herein, the term "at-risk" refers to an individual or entity that may have PII that may also be in the exposed or compromised data. For the purposes of this disclosure, if PII belonging to a customer of a company (entity) has been exposed, then that company can be considered at-risk. An at-risk entity or at-risk individual may be at risk of losing money or of reputational harm.

Further, an at-risk entity may be in danger of opening new fraudulent accounts based on the exposed data, permitting account takeover of an existing account based on the exposed data, experiencing theft of services based on the exposed data, allowing unauthorized access to further information (such as tax returns) based on the exposed data, and so on. In certain embodiments, the PII data may include names, dates of birth, addresses, social security numbers, email addresses, phone numbers, credit card numbers, bank information, other data, or any combination thereof. Such data may be used to identify a particular consumer and which may be misused to attempt to open accounts (such as new services, lines of credit, and so on), gain access to existing accounts, and so on.

Embodiments of compromised identity exchange systems and methods are described below that may be configured to host compromised data or to exchange encrypted data with distributed data sources in order to evaluate risk, to mitigate harm to companies and consumers from such data breaches, or any combination thereof. The compromised identity exchange systems and methods may include capturing compromised data in a disassociated and encrypted form, decrypting the compromised data, and re-encrypting each field of the compromised data using different encryption keys for each field. The re-encrypted compromised data may be hosted by a compromised identity data exchange and personal identifying information (PII) data may be compared to the re-encrypted compromised data to determine a match. Potential risk to a consumer or to an at-risk entity may be determined based on the results of the match. As used herein, the term "disassociated" or "disassociated PII" may refer to PII data elements (identity elements) that have been separated or disconnected from one another by the data originator. In certain embodiments, the disassociated data may be separated or disconnected in such a way that the data elements may not be re-associated to correlate the data to an actual consumer identity by anyone other than the data originator, provided the data originator has the key to map the full identity back together.

In some embodiments, some or all of the compromised data may be hosted by other sources, such as one or more compromised entities. The compromised identity exchange system may receive a query including PII data from one of an at-risk entity or a consumer. The compromised identity exchange system may disassociate and encrypt the PII data from an at-risk entity if the at risk entity did not perform the disassociation and may communicate the encrypted data to one or more of the compromised entities in response to the query. The compromised identity exchange system may receive results from the one or more entities in response to the queries where a match was made to a full PII identity or disassociated identity elements. Each match returned can include information about the data breach, which may consists of the date of the breach, the size/volume of the breach, a code indicating how the data was lost or stolen, among other attributes. In addition to these attributes, attributes associated with the consumer may also be used to measure risk. These attributes might include the number and severity of data breaches a consumer has been involved with, the location of the consumer, the event, if any, that is triggering the risk assessment, among other things. Additionally, participating at-risk entities' reported fraud data will be used to identify fraud rates within every compromised entity's compromised file, as well as attributes will be generated that reflect location of fraud, fraud linkages to email, physical address, phone number or other identity elements. All of these data can be aggregated into risk based results, the aggregated results, or any combination thereof. The compromised identity exchange system may communicate the results, a risk indicator, or any combination thereof to the requester (i.e., the at-risk entity or the consumer).

Additionally, in some embodiments, a risk assessment module may be included within a compromised PII exchange system. The risk assessment module may include a crawler or spider application that can be configured to access a plurality of websites (which may be identified by a list of Uniform Resource Locators (URLs)) to search for patterns of data that resemble PII data, and optionally to scrape data from the sites. The URLs may include a list compiled by an operator or administrator. The crawler or spider application may scrape data corresponding to the patterns, or may scrape all data from each website of the plurality of websites and store the data in a database. The risk assessment module may then process the extracted data to identify patterns representing PII data elements. The identified matters may be provided to an administrator for review, to an artificial intelligence (AI) engine for analysis, or both. Once confirmed as PII data, the extracted PII data may be added to a database of compromised PII data.

In some embodiments, the risk assessment module may compare the portions of the data that correspond to such patterns to disassociated PII data in a compromised PII database to identify matches. If a single match is found, a risk score associated with the matched data item in the compromised PII database may be increased. If multiple matches are found, the risk assessment module may determine if the multiple matches correspond to a single data breach and, if so, a risk score associated with the particular data breach that is shared by the multiple data items may be increased so that all PII data associated with the particular breach may be flagged as a high risk. Otherwise, the risk scores associated with the matched data may be updated to reflect an increased risk. One possible embodiment of a compromised identity exchange system configured to host compromised PII data and to evaluate risk is described below with respect to FIG. 1.

FIG. 1 depicts a block diagram of a system 100 including a compromised PII exchange system 102, in accordance with certain embodiments of the present disclosure. The compromised PII exchange system 102 may receive personal identifying information (PII) data from one or more compromised (exposed) companies, each of which may have had at least a portion of its customer data compromised through accidental data loss, exposure, theft, or a data breach. The compromised PII exchange system 102 may receive the PII data, preferably in an encrypted and optionally disassociated form, from the compromised companies. The compromised PII exchange system 102 may re-encrypt the PII data and may store the re-encrypted PII data in a database of compromised data 122. In certain embodiments, the re-encrypted PII data may be disassociated, and each field of the PII data may be encrypted with a different encryption key during the re-encryption process. By encrypting each field with a different key, the encrypted data may be much more difficult for an unauthorized person to access. Further, by maintaining the data in a disassociated form, even if the data were breached, it would not be possible to reassemble the PII data.

In some embodiments, each encrypted data item may be stored with a breach identifier corresponding to the data exposure event in which the compromised data was exposed. In certain embodiments, a compromised company may provide the PII data with an identifier for each field provided by the company, and the compromised PII exchange system 102 may re-encrypt the PII data, the identifier, and the breach identifier. Other embodiments are also possible.

In certain embodiments, the compromised PII exchange system 102 may communicate with at-risk entities 104, 106, and 108 via a network 112. Each entity 104, 106, and 108 may maintain customer data 114, 116, and 118, respectively. The compromised PII exchange system 102 may also communicate via the network 112 with computing device 120, such as smart phones, laptops, tablets, notebooks, or other data processing devices, at least some of which may be associated with particular consumers.

In certain embodiments, a consumer or an at-risk entity may want to determine if its data may correspond in some way to the data that was exposed. The consumer or at-risk entity may communicate at least a portion of its PII data to the compromised PII exchange system 102 for comparison against the compromised PII data 122. In some embodiments, the portion of the PII data may be disassociated and encrypted prior to transmission. The compromised PII exchange system 102 may re-encrypt the PII data in the same manner as the PII data stored in the compromised PII data 122 and may compare the re-encrypted PII data from the source to the compromised PII data 122. The compromised PII exchange system 102 may return data related to the results of the comparison.

In some embodiments, the data returned may include a risk assessment score based on the results of the comparison. For example, if the data corresponds to PII data that has previously been identified in a fraudulent transaction, or that the compromised entity data breach is actively being used in fraudulent ways, the risk assessment score may be high. In another example, if the data results correspond to a low-risk event (such as a lost laptop computer) or an older event with no known harm, the risk assessment score may be lower.

The compromised PII exchange system 102 may be configured to search data from multiple data sources 124, such as websites that are not indexed on search engines (e.g., websites associated with the "Dark" web), to identify patterns of data that may represent PII data. Such patterns can include, but are not limited to, entity names (first name, last name, middle name or initial, etc.), social security numbers, email addresses, phone numbers, addresses, and other types of information that can be presented in a particular pattern, which pattern can be identified whether or not the information is labeled. In some instances, in response to identifying such a pattern, the compromised PII exchange system 102 may extract a URL associated with the data source or scrape the data from the data source.

The compromised PII exchange system 102 may include a risk assessment module 126 that may include a crawler application 128. The crawler application 128 may extract, transform, and load (i.e., scrape) data from one or more of the multiple data sources 124 (such as those identified by the search), and may store the scraped data in a database 130. The data sources 124 targeted by the crawler application 128 for scraping may be identified by URL data 132, which may be a list of webpages, Internet Protocol addresses, or other URL data that can be used by the crawler application 128 to locate and access the data hosted by the data sources 124. In some embodiments, the URL data 132 may also include credentials for logging onto a particular data source 124.

The risk assessment module 126 may further include pattern analytics 134 that may be used to process the scraped data 130 to identify patterns of data that may represent entity names, birthdates, email addresses, mailing addresses, social security numbers, phone numbers, and so on. Whether such information is prefaced by particular introductions such as "Name", "Address," "Birth Date", "Social Security Number", or not, the format or pattern of the data may suggest possible PII items. The portions of the scraped data that represent potential PII data may be provided to a PII detector 136, which may be configured to process the identified patterns to determine if the patterns can be PII information. For example, a social security number in the format of 000-00-0001 is not valid PII information because the number is not a valid social security number. Other false positives may be eliminated based on the content of the pattern. In some embodiments, the PII detector 136 may be implemented as a machine learning engine or an artificial intelligence engine, which may be configured to learn over time. The potential PII data may be presented to an administrator via an alerting module 142, which may present the potential PII data within an interface, such as an Internet browser application, to allow the administrator to manually review the data to verify whether the potential PII data corresponds to actual PII data. The machine learning or AI engine may learn based on verification by the administrator.

In some embodiments, the PII detector 136 may provide potentially valid PII information to a PII comparator 138, which may be configured to search the disassociated PII data of the database 122 using the potentially valid PII information to determine a match. If a match is found, the risk scoring module 140 may adjust a risk score associated with the matched data item in the compromised PII data 122. If multiple matches are found from the scraped data 130, the risk scoring module 140 may increase a risk score associated with a breach event that corresponds to the various matches. Further, if no matches are found, the risk scoring module 140 may determine a risk score associated with the data.

In some embodiments, extracted patterns can be combined and quantified, resulting in a series of numbers that may be used to rank order the webpages based on a metric of page-relevance pertaining to compromised information. The rank order may determine the order by which the crawler 128 may return to the webpages to extract additional information and may be used as part of the risk score determination. In certain embodiments, the pattern analytics 134 may identify patterns of digits representing commonly breached pieces of PII data, such as social security numbers, phone numbers, and credit card numbers, which may be verified by the PII detector 136. Further, the risk scoring module 140 may determine a risk score associated with the PII data, either based on the result of the comparison by the PII comparator 138 or independently.

In some embodiments, the results of the data pattern detection may also be provided to an administrator via an interface provided by the alerting module 142. The administrator may interact with the interface to review the results and to create a customized heuristic score that can be used to rank order the webpages from which the data patterns were extracted. The customized heuristic score may be determined based on the administrator's preference, knowledge, and expertise and so on. In some embodiments, the customized heuristic score may be used to supplement or complement the risk score that may be produced automatically by the risk scoring module 140. Further, the risk assessment module 126 may flexibly allow an administrator to attenuate or otherwise modulate the webpage rank ordering process to fit a desired PII profile preference.

In an example, data from a breach event may find its way onto a particular website to market the breach data to a potential buyer. The seller of the data may provide a limited portion of the stolen PII data (such as a data sample) to enable the potential buyer to verify the data. However, the patterns of the data, even when the data is limited, may be detected by the pattern analytics 134 and verified by the PII detector 136 and the PII comparator 138, enabling detection of the compromised PII data available from an unauthorized data source 124. Once it is known that the compromised PII data is being shared or used from such data sources 124, the risk associated with reliance on such PII data as a correct indicator of a particular user increases dramatically, and the risk assessment score for that PII data should be increased to reflect the risk. Accordingly, the risk scoring module 140 is configured to adjust the score to reflect the risk. Further, the alerting module 142 may alert an administrator of the match, enabling the administrator to provide the source information and information related to the stolen PII data to law enforcement.

In certain embodiments, the compromised PII data 122 may include encrypted and disassociated data together with an event identifier. The event identifier may include a code or number associated with a particular data exposure event, such as a hack, a breach, or other unauthorized access or exposure of the data. Such events may include intentional or unintentional releases of secure information to an untrusted environment, including exposure due to concerted attacks or through accidental data leaks. Once exposed, the leaked data may be utilized for nefarious activities, such as account takeover, fraudulent credit applications and so on. By including an event identifier, subsequent usages of the data may be correlated to the data exposure event, making it possible to potentially fraudulent activity based on usage of such exposed data. Further, when multiple matches are found between the extracted or identified PII data patterns and the compromised PII data that share a common data exposure event, the risk score associated with any PII data that corresponds to the common data exposure event may be increased to reflect the potential that usage indicates potentially fraudulent activity.

In certain embodiments, the compromised PII exchange system 102 may operate as a data exchange to allow companies that have experienced a data breach (e.g., a compromised entity) to share (securely) at least an indication of correspondence of particular data to their compromised customer data. In some embodiments, the compromised entity 104 may disassociate its compromised customer data and encrypt the disassociated data before sending the encrypted disassociated PII data to the compromised PII exchange system 102. The compromised PII exchange system 102 may unencrypt the encrypted disassociated PII data and may re-encrypt the data using a different key for each field, which re-encrypted data may be stored in the database of compromised data 108. In some embodiments, data from multiple compromised entities may be aggregated and stored in the database or compromised data 108. In certain embodiments, the aggregated compromised data 108 may be stored in an encrypted and disassociated form, such that even the compromised PII exchange system 102 cannot recover data corresponding to a particular customer. The data may be encrypted with an event identifier associated with the particular compromising event. In certain embodiments, the compromised data may be searched to identify matches with received customer data, and the compromised PII exchange system 102 may be configured to provide an indication of potential risk based on a match or the absence of a match with the compromised data 108. Other embodiments are also possible.

In some embodiments, as discussed above, the risk assessment module 126 may be configured to scrape data (using the crawler 128) from a plurality of data sources 124, to store the data in a database 130, and to process the data to detect patterns using pattern analytics 134. Further, the risk assessment module may be configured to detect potential PII data (using PII detector 136), to compare the PII data to compromised PII data 122 using the PII comparator 138, and to selectively adjust a risk assessment score (using risk scoring module 140) according to the results of the comparison. The risk assessment score may be communicated to an at risk entity 108 in response to a request.

In certain embodiments, the risk assessment module 126 may be configured to utilize a text processing and ranking framework to identify web pages (or other data sources 124) including information pertinent to data breaches and compromised credentials. The pattern analytics 134 may allow the risk assessment module 126 to flexibly extract specific patterns of digits, symbols and named entities that are relevant to identifying breached information. Extracted patterns can be combined and quantified, resulting in a series of numbers that may be used to rank order page-relevance pertaining to compromised information. In certain embodiments, the risk assessment module 126 may identify patterns of digits representing commonly breached pieces of PII data, such as social security numbers, phone numbers, and credit card numbers. Further, the risk assessment module 126 may identify named entities representing individual consumers whose personal information may have been compromised. Additionally, the risk assessment module 126 may identify email addresses and other suspicious patterns of digits and symbols that represent sensitive compromised information.

In some embodiments, the risk assessment module 126 may deploy new patterns of interest immediately, as research may reveal changes in breached data posting behavior, such as, for example, inclusion of additional digits in a social security number or phone number, encoding of numbers as letters, and other deceptive practices. In certain embodiments, the risk assessment module 126 may flexibly codify the semantic content of each page to produce broad descriptions of the topics and content of each page. Moreover, the risk assessment module 126 may quantify and aggregate patterns of interest into a numeric value or a set of numbers that may be used to rank order the relevance of currently available information. Further, the risk assessment module 126 may incorporate both positive and negative information in the rank ordering procedure, and may allow for reviewing, identifying, cataloging, and tagging of relevant information as the result of the quantification process. In some embodiments, the risk assessment module 126 may allow for the for the implementation of supervised learning algorithms, such as logistic regression, gradient boosted trees, support vector machines, neural networks, or any other common classification technique, which methods may be used to refine and enhance the ranking capabilities the risk assessment module 126. In some embodiments, the results of the data pattern detection may also be provided to an administrator via an interface provided by the risk assessment module 126. The administrator may interact with the interface to review the results and to create a customized heuristic score that can be used to rank order the webpages from which the data patterns were extracted. The customized heuristic score may be determined based on the administrator's preference, knowledge, and expertise and so on. In some embodiments, the customized heuristic score may be used to supplement or complement the risk score that may be produced automatically by the risk assessment module 126. Further, the risk assessment module 126 may flexibly allow an administrator to attenuate or otherwise modulate the webpage rank ordering process to fit a desired PII profile preference.

The risk assessment module 126 may allow for the use of relevant pages to expand the search for and acquisition of additional relevant information, such as by adding to the URL data 132 manually to direct the crawler 128 or other search modules to scan the associated pages. In some embodiments, the risk assessment module 126 may automatically extract consumer PII and credentials for inclusion in the scraped data 130. In some instances, the scraped data 130 may be made available for searching, whereby consumers can visit a website to search and verify if their information has been compromised. Other embodiments are also possible.

In certain embodiments, the compromised company may be unwilling to share its PII data for hosting by another party. In such an instance, the compromised PII exchange system 102 may cooperate with an installable software implementation of the PII exchange application, which may be distributed to each of the compromised systems in order to perform the risk assessment checks. One possible example of a distributed exchange system is described below with respect to FIG. 2.

Figure 2:
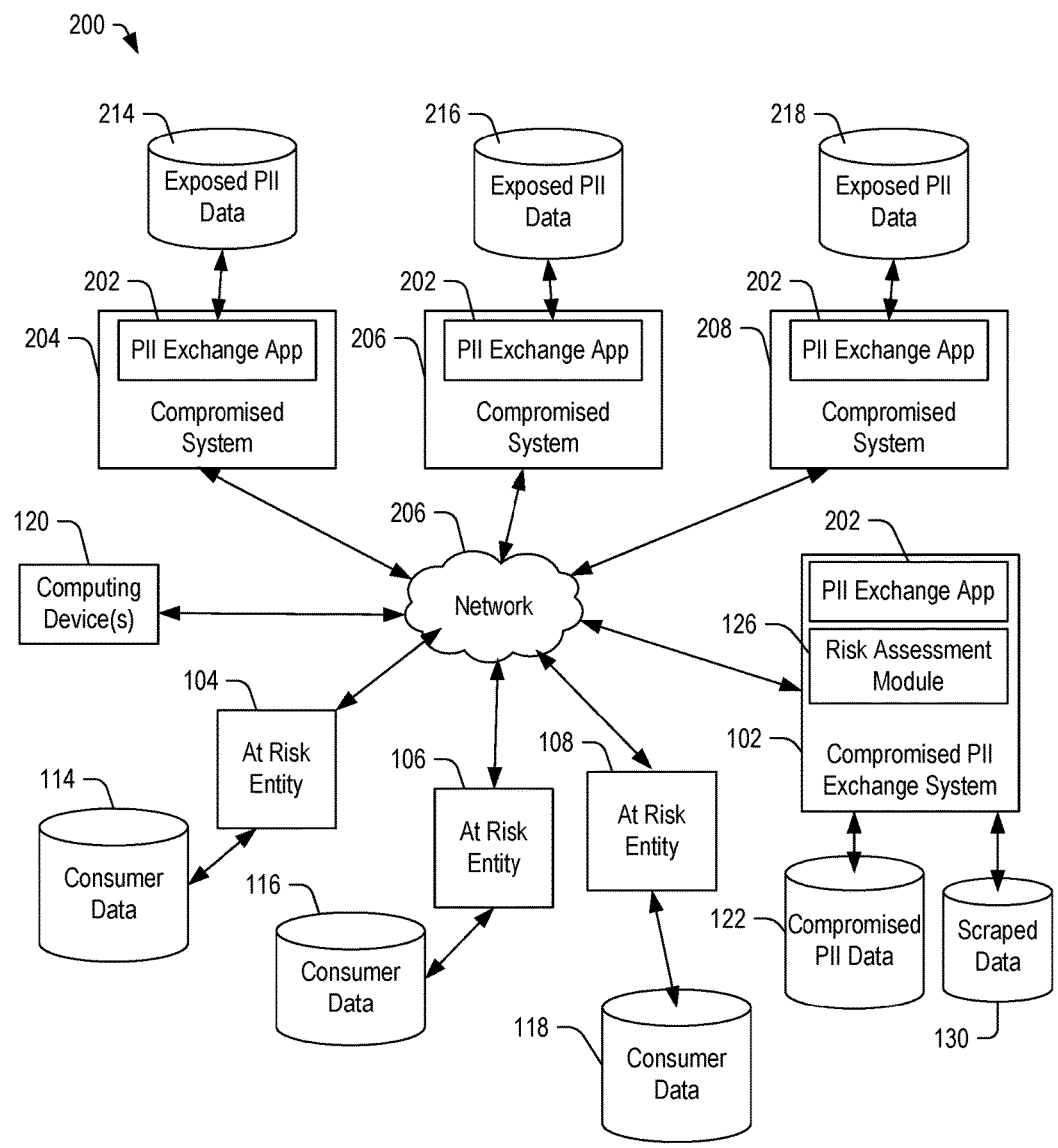
FIG. 2 depicts a block diagram of a compromised identity exchange system including distributed data sources, in accordance with certain embodiments of the present disclosure.

FIG. 2 is a block diagram of a system 200 including the compromised PII exchange system 102, in accordance with certain embodiments of the present disclosure. In some embodiments, the system 200 may be an embodiment of the system 100 of FIG. 1.

The system 200 may include the compromised PII exchange system 102 configured to communicate with the exposed or compromised entities 204, 206, and 208 through secure communications links. In certain embodiments, the exposed or compromised entities 204, 206, and 208 may store customer PII data, some of which may have been exposed. In the illustrated example, each compromised entity or system 204, 206, and 208 may install a PII exchange application 202, which may be used to disassociate and encrypt each field of the compromised PII data (using different keys) to produce re-encrypted exposed PII data 214, 216, and 218, respectively. Further, PII exchange application 202 may communicate with a PII exchange application 202 at the compromised PII exchange system 102 to verify PII data from consumers and at-risk entities as previously discussed.

In certain embodiments, each compromised system 204, 206, and 208 may maintain and host its own compromised data, which data has been disassociated and re-encrypted by the PII exchange application 202. In certain embodiments, in response to receiving PII data from a source, such as an at-risk entity 104, 106, or 108, or from a computing device 120, the PII exchange application 202 of the compromised PII exchange system 102 may re-encrypt the PII data. The compromised PII exchange system 102 may send the re-encrypted PII data to the PII exchange applications 202 at the compromised systems 204, 206, and 208 so that they may search the exposed PII data 214, 216, and 218. Each PII exchange application 202 may communicate data related to the comparison to the PII exchange application 202 at the compromised PII exchange system 102.

Further, in some embodiments, the compromised PII exchange system 102 may include a risk assessment module 126, as discussed with respect to FIG. 1. In this example, the risk assessment module 126 may determine risk assessment scores and may communicate the risk assessment score information to the PII exchange applications 202. Additionally, as discussed above, the risk assessment module 126 may be configured to search one or more data sources for patterns of data that may correspond to PII data. The data patterns may be evaluated automatically on a per page score to determine relevancy ranking. The risk assessment module 126 may utilize the relevancy ranking to determine an order in which data may be extracted and processed (or presented to an administrator). Additionally, the ranking may be used as part of a risk assessment score, such that higher relevancy scores may indicate a higher risk with respect to the PII data. Further, once the data is extracted and processed, the data may be stored within the compromised PII data 122 as a new data breach, compared against data stored in the compromised PII data 122 to update a risk score associated with any matches of such data, shared with each compromised system 204, 206, and 208, or any combination thereof.

Further, in some embodiments, the results of the data pattern detection may also be provided to an administrator via an interface provided by the risk assessment system 126. The administrator may interact with the interface to review the data pattern results and to create a customized heuristic score that can be used to rank order the webpages from which the data patterns were extracted. The customized heuristic score may be determined based on the administrator's preference, knowledge, and expertise and so on. In some embodiments, the customized heuristic score may be used to supplement or complement the risk score that may be produced automatically by the risk assessment module 126. Further, the administrator may interact with the interface to configure or customize a webpage rank ordering process to produce an adjusted PII profile preference.

In some embodiments, the PII exchange applications 202 may periodically request risk assessment score information from the PII exchange system 102 to update its stored data. In response to the request, the risk assessment module 126 may compare data from the requesting PII exchange application 202 to the scraped data 130 and selectively adjust the risk score for portions of the received PII data that matches data from the scraped data 130. The compromised PII exchange system 102 may return a risk score to the requesting PII application 202.

In certain embodiments, the compromised PII exchange system 102 may aggregate the results and provide data corresponding to the results to the source of the request (e.g., an at-risk entity 104, 106, 108, or a consumer using a computing device 120). The data corresponding to the results may include a composite risk assessment score based on the results. For example, if the particular data is associated with multiple (exposed) data sets, the composite risk assessment score may be higher than if it was associated with only one. Further, if the particular data is associated with any of the exposed data sets, the result of the comparison from the various PII exchange applications 202 may include an identifier associated with the particular exposure event (e.g., how was the data exposed?). This identifier may also contribute to the risk assessment score, since an exposure due to a hacking event may have a different risk assessment than one due to a missing laptop computer or a lost credit card. Various examples of methods of determining the risk assessment score are discussed below.

Figure 3:
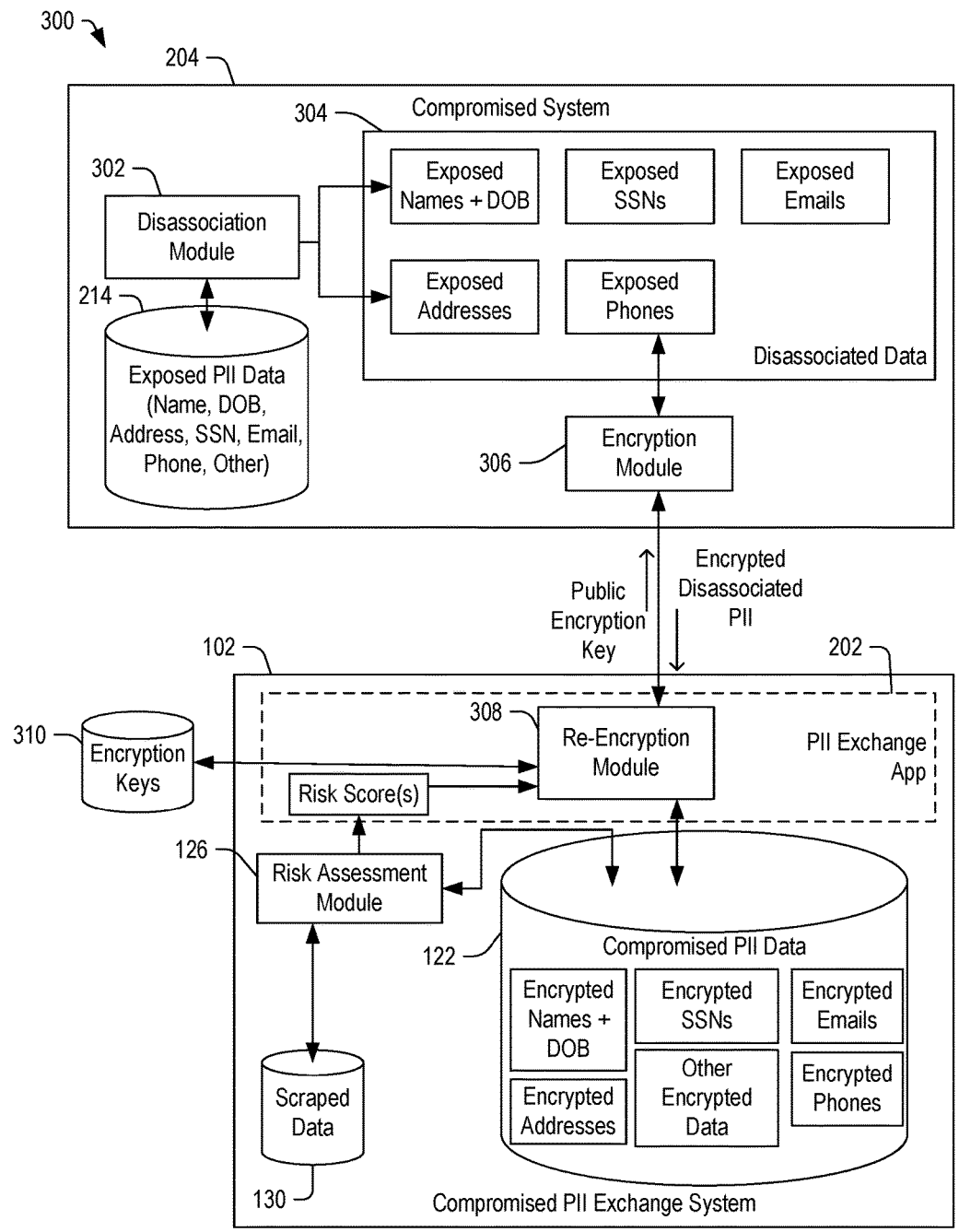
FIG. 3 depicts a block diagram of a compromised identity exchange system, in accordance with certain embodiments of the present disclosure.

FIG. 3 is a block diagram of a system 300 including a compromised identity exchange system 302, in accordance with certain embodiments of the present disclosure. The system 300 may include a compromised system 204 configured to communicate with the compromised PII exchange system 102. The compromised system 204 may be a company that has experienced a data breach or other authorized exposure of consumer data.

The compromised entity 204 may include the exposed PII data 214 in a database. The exposed PII data 214 may include exposed names, dates of birth, social security numbers, addresses, phone numbers, email addresses, other data, or any combination thereof. The compromised company 204 may disassociate the PII data using a disassociation module 302 to form disassociated data 304. The disassociated data 304 may include the PII data in an unassociated form so that the PII data cannot be recovered from the disassociated data 304 to associate the data to a particular consumer. The disassociated data 304 may then be encrypted using a unique key using an encryption module 306, which may be provided by or shared with the compromised PII exchange system 102. The encrypted, disassociated PII data may be sent to the compromised PII exchange system 102.

The compromised PII exchange system 102 may unencrypt the received PII data and may re-encrypt the PII data using a re-encryption module 308 of the PII exchange application 202. In certain embodiments, the re-encryption module 308 may re-encrypt the PII data using a unique key from a plurality of encryption keys 310 for each field to produce compromised PII data 122. The plurality of encryption keys 310 may be remote from the compromised PII exchange system 102. In certain embodiments, incoming compromised PII data may be formatted, encrypted and aggregated with the compromised PII data 122.

The compromised PII exchange system 102 may include the risk assessment module 126 and scraped data 130. The risk assessment module 126 may process received disassociated PII items against the scraped data 130 to determine a risk score. In some embodiments, pattern data scraped from one or more data sources and verified as PII data may be disassociated, encrypted, and stored in the compromised PII data 122, as if the data represented a new data breach. Further, in some embodiments, the risk assessment module 126 may compare portions of the scraped data 130 to data stored in the compromised PII data 122. In response to detecting a match, the risk assessment module 126 may update a risk score associated with the matched data.

In some embodiments, the risk assessment module 126 may provide an interface including the scraped data 130 or other information to an administrator. The administrator may interact with the interface to review the results and to create a customized heuristic score that can be used to rank order the webpages from which the data patterns were extracted, to adjust the webpage rank ordering process to produce an adjusted rank ordering process, or any combination thereof.

In certain embodiments, since all PII data stored by the compromised PII exchange system 102 has been disassociated, there may be cases where multiple elements of the original PII data match the exposed identity database in the compromised PII data 122; however, the matching data may not necessarily be associated with each other from the same original consumer identity. For example, a common name, such as "John Smith," and a common address, such as "123 Main Street," might match data within the re-encrypted compromised PII data 122; however, the matching data may be sourced from different records. Because the PII data has been disassociated prior to being received by the compromised PII exchange system 102, neither the compromised PII exchange system 102 nor the end-user will know how the match was achieved.

In general, two potential attack vectors exist for attacking the compromised PII exchange system 102. One possible attack involves a bad actor able to intercept transmission of data to the compromised PII exchange system 102. Another possible attack involves a hack or breach of the compromised PII exchange system 102. However, attacks of the first kind can be handled using industry standard transmission policies, with the additional precaution of using unique public/private key combinations for each participant. The only way a third party could decrypt this data would be if they had access to a private key of the compromised PII exchange system 102, which means that attacks of the first kind rely on an attack of the second type.

In the unlikely event that the compromised PII exchange system 102 is hacked, an intruder could gain access to the database (i.e., the compromised PII data 122). However, since all the PII fields in the compromised PII data 122 are encrypted using different keys and since the PII fields are disassociated, such a hack would still not expose the data. In order to gain access to the raw data, the intruder would also need to gain access to the key-store (encryption keys 310) of the compromised PII exchange system 102, which cannot be accessed by breaching the compromised PII exchange system 102. In certain embodiments, the encryption keys 310 may be stored in another location remote from the compromised PII data 122 and remote from the compromised PII exchange system 102 to provide an additional layer of protection. Even in the event that a hacker was able to penetrate the compromised PII exchange system 102 as well as the encryption keys 310, the hacker would only be able to access individual, un-linkable (disassociated) PII elements, which are of relatively little value.

Figure 4:
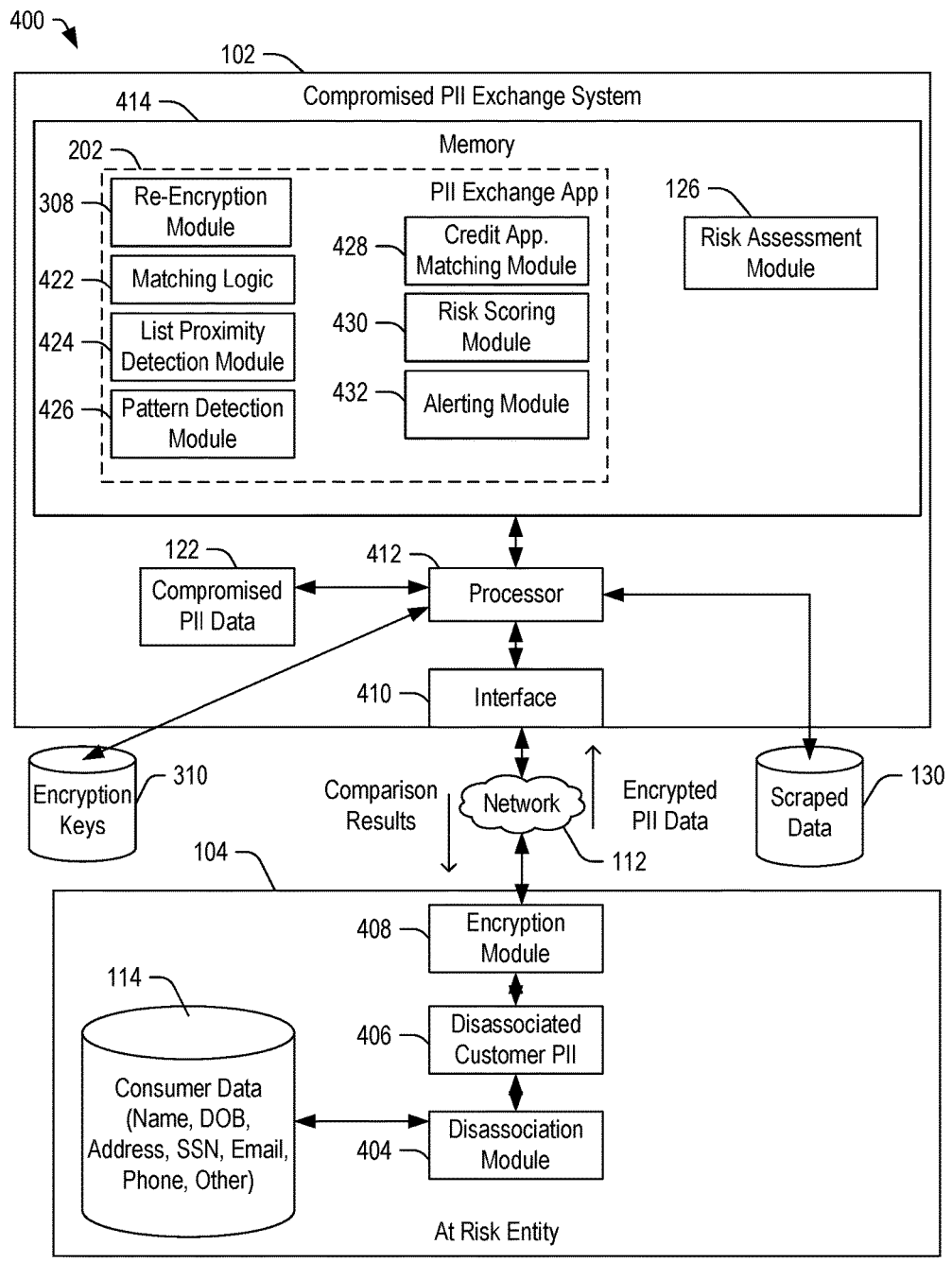
FIG. 4 depicts a block diagram of a compromised identity exchange system, in accordance with certain embodiments of the present disclosure.

FIG. 4 is a block diagram of a system 400 including compromised PII exchange system 102, in accordance with certain embodiments of the present disclosure. The system 400 may include an at-risk entity 104 configured to communicate with the compromised PII exchange system 102 via the network 112. The at-risk entity 104 may host consumer data 114 in one or more databases. The consumer data 114 may include names, dates of birth, addresses, phone numbers, emails, social security numbers, other information, or any combination thereof.

In certain embodiments, the at-risk entity 104 may include consumer data 114, which data may need to be evaluated for risk due to a data exposure event at another company. The at-risk entity 104 may extract at least a portion of the consumer data 114 and process the PII data using a disassociation module 404 to produce disassociated customer PII data 406. The at-risk entity 104 may process the disassociated customer PII data 406 using an encryption module 408 and may send the encrypted disassociated PII data to the compromised PII exchange system 102.

The compromised PII exchange system 102 may include an interface 410 coupled to the network 112 and to a processor 412, which may be coupled to compromised PII data 122, to the scraped data 130 and to a memory 414. In some embodiments, the scraped data 130 may be stored within the memory 414. In some embodiments, the scraped data 130 may be encrypted using the same encryption keys 310 as used with the PII data. In certain embodiments, the memory 414 may include data and a PII exchange application 202. The PII exchange application 202 may be executed by the processor 412 to verify the PII data against the compromised PII data 122. Further, the memory 414 may include the risk assessment module 126.

In certain embodiments, the PII exchange application 202 may include a re-encryption module 308 configured to unencrypt the encrypted PII data from the at-risk entity 104 and to re-encrypt each field of the PII data with a different one of the encryption keys 310. The PII exchange application 202 may provide the re-encrypted data to the matching logic 422, which may cause the processor 412 to compare the PII data to the compromised PII data 122 to determine whether a match exists. Further, the PII exchange application 202 may utilize the risk assessment module 126 to compare the encrypted data to the scraped data 130 to determine a match. The risk assessment module 126 may provide data related to the comparison to the risk scoring module 430, which may use the data in the determination of the risk assessment score. The PII exchange application 202 may provide the results of the comparison to the risk scoring module 430, which may determine a risk assessment score and provide the score to an alerting module 432 that, when executed, may cause the processor 412 to communicate data related to the risk assessment score to the at-risk entity 104.

In certain embodiments, the PII exchange application 202 may include one or more modules to analyze matches. In certain embodiments, the PII exchange application 202 may quantify activity level based on the number of matches as one quantitative risk factor. In some embodiments, the PII exchange application 202 may include a list proximity detection module 424 that, when executed, may cause the processor 412 to identify proximity of a particular match to other previous matches or to other matches within the PII data. In some embodiments, proximity may refer to the proximity of the data to other data in the table of data, which proximity may suggest fraudulent activity involving a portion of the compromised data. In certain embodiments, the proximity may refer to a geographic proximity of addresses suggesting that a crime syndicate may be operating within a particular region or area.

In certain embodiments, the PII exchange application 202 may also include a pattern detection module 426 that, when executed, may cause the processor 412 to identify a pattern with respect to area, neighborhood, names, or other matching PII data. The pattern detection provided by the pattern detection module 426 may differ from the type of pattern detection applied by the risk assessment module 126. The pattern analytics 134 of the risk assessment module 126 may look for arrangements of numbers (that can resemble a social security number, a phone number, a birth date or a street address), arrangements of words (that can resemble a full name, a place of work, a street, and so on), arrangements of letters and numbers (that can represent a mailing address, a password, and so on), and other types of patterns. The portions of the data that fit one of the possible patterns may be used to search the scraped data 130.

In certain embodiments, the PII exchange application 202 may include a credit application matching module 428 that, when executed, may cause the processor 412 to store data corresponding to matches in the compromised PII data. Further, the credit application matching module 428 may detect multiple fraudulent credit applications based on the stored credit application data. In certain embodiments, the matching logic 422 may search the stored credit application data to detect potential fraudulent activity.

In certain embodiments, the risk scoring module 430 may cause the processor to evaluate risk based on a variety of characteristics of the fraud data, the consumer and of the breach. For example, a particular data breach may involve 15 million records. In such a case, the probability that a particular data item may be misused may be approximately one out of fifteen million, indicating a relatively low risk. However, multiple matches of PII data items associated with that breach to the scraped data 130 may indicate that the data from the breach may have been sold or may be at an elevated risk of misuse.

In contrast, if the data breach involved only 20 records, then the probability may be one out of twenty, which high probability increases the potential risk. If the higher probability is also coupled with a match by the risk assessment module 126 to the scraped data 130, the risk assessment valuation by the risk scoring module 430 may be increased.

Other factors that can influence the risk assessment scoring module 430 may include facts about the data breach, including how the data was exposed, when the data was exposed and so on. A risk score for a particular consumer may increase based on the number of data breaches for which PII data of that user has been included. Further, if various instances of matches correspond to known or suspected fraud events, the matches suggest that the data is being used, and thus the risk increases substantially. Other embodiments are also possible.

In certain embodiments, the risk scoring module 430 may implement a heuristic approach that takes into account one or more factors associated with the breach and with the matching of the PII data. The heuristic approach may be extended to information determined by the risk assessment module 126 with respect to the scraped data 130. In certain embodiments, the matching logic 422 may cause the processor 412 to match PII elements with the data in the compromised PII data 122 to look for a number of matches, where the breach occurred, the severity of the breach, the general statistical sense of risk, and so on. The matching logic 422 may further cause the processor 412 to utilize the risk assessment module 126 to compare data items to the scraped data 130 to determine if actual instances of exposure have been verified from various websites, for example. The data from the matching logic 422 and the results of the comparison from the risk assessment module 126 may then be provided to the risk scoring module 430, which may determine a risk score. In certain embodiments, the alerting module 432 may cause the processor 412 to provide the comparison results including the risk assessment score to the at-risk entity 104 through the network 112. In some embodiments, the alerting module 432 may also provide an interface including the PII data or other information to an administrator. The administrator may interact with the interface to review the results and to create a customized heuristic score that can be used to rank order the webpages from which the data patterns were extracted, to adjust the webpage rank ordering process to produce an adjusted rank ordering process, or any combination thereof. Subsequently, the risk scoring module 430 may utilize the customized heuristic process to determine the risk score or may combine a score produced using the customized heuristic process with a score determined by the risk scoring module to determine the risk score. Other embodiments are also possible.

In some embodiments, pattern data scraped from one or more data sources and verified as PII data (using the risk assessment module 126) may be disassociated, encrypted, and stored in the compromised PII data 122, as if the data represented a new data breach. Further, in some embodiments, the risk assessment module 126 may cause the processor 412 to compare portions of the scraped data 130 to data stored in the compromised PII data 122. In response to detecting a match, the risk assessment module 126 may update a risk score associated with the matched data. In addition and even if a match is not found, the risk assessment module 126 may cause the processor 412 to store the scraped data in the compromised PII data 122 as newly compromised data.

In the example of FIGS. 3 and 4, the compromised or exposed entity communicated the exposed PII data to the compromised PII exchange system 102. In some embodiments, the compromised or exposed entity may be reluctant to provide the exposed PII data to a third party exchange. Accordingly, the PII exchange application 202 may be deployed for use by the exposed entity.

Figure 5:
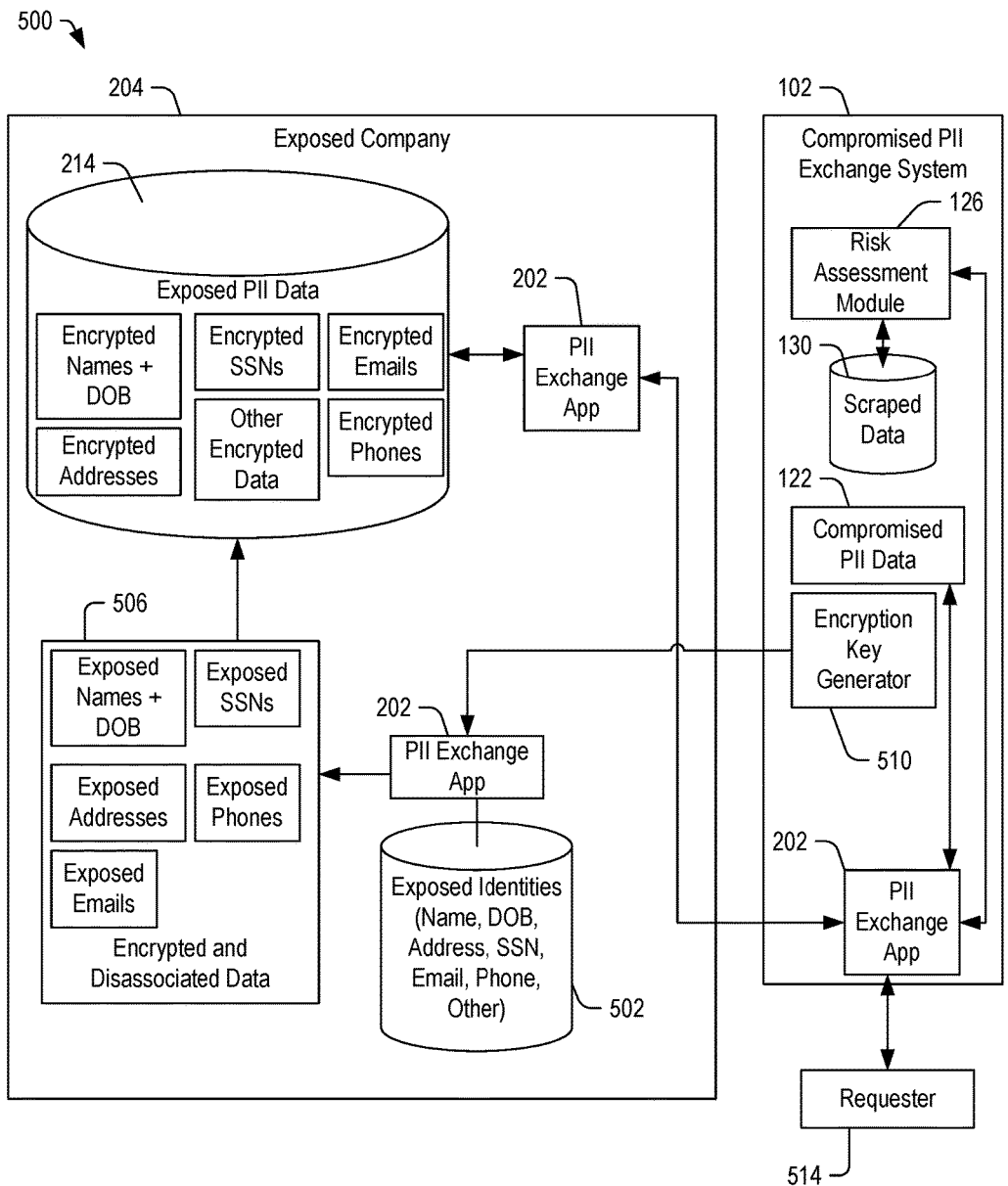
FIG. 5 depicts a block diagram of a compromised identity exchange system including a distributed data source, in accordance with certain embodiments of the present disclosure.

FIG. 5 depicts a block diagram of a compromised identity exchange system 500 including a distributed data source, in accordance with certain embodiments of the present disclosure. The system 500 may include an exposed entity 204 configured to communicate with a compromised PII exchange system 102, such as the compromised PII exchange systems described above with respect to FIGS. 1-4. In certain embodiments, the exposed company 204 and the compromised PII exchange system 102 may both include a PII exchange application 202.

In certain embodiments, the exposed company 204 may include exposed identity data 502. The exposed company 204 may utilize the PII exchange application 202 to disassociate and encrypt the data to form encrypted and disassociated data 506, which may be stored in exposed PII data 214. In certain embodiments, the PII exchange application 202 may generate one or more encryption keys or may receive one or more encryption keys from the compromised PII exchange system 102. In certain embodiments, the PII exchange application 202 may encrypt each item of disassociated data using a different encryption key. In some embodiments, each item may also be encrypted with an associated event identifier and a unique identifier that can be used to re-associate the data at a later time, if needed. The unique identifier may be stored in a table or database at another location and may be used to restore the disassociated data to recover a complete PII data set for a consumer, if desired.

In certain embodiments, a requester 514 may provide data to the compromised PII exchange system 102, which may unencrypt and re-encrypt the data using a PII exchange application 202. The re-encrypted data may be compared to compromised PII data 122 and may be sent to the PII exchange application 202 of the exposed entity 204. The PII exchange application 202 may unencrypt and re-encrypt the data and compare the data to the exposed PII data 214. The results from both comparisons may be reported to the PII exchange application 202 of the compromised PII exchange system 102, and the PII exchange application 202 may determine a risk assessment score and report the data to the requester 514.

In this example, the PII exchange system 102 may also include the risk assessment module 126 and the scraped data 130. The risk assessment module 126 may inform the risk assessment score based on matches between the encrypted PII data relative to the scraped data 130, which may be similarly encrypted. Further, the risk assessment module 126 may store the data in the exposed PII data via the PII exchange application 202 as newly compromised data. In response to a match, the risk assessment score may be increased. Further, in response to multiple matches, a risk assessment for a particular exposure event may be increased to account for the likely increased risk. Further, in determining the risk assessment score, the risk assessment module 126 may utilize a customized heuristic process produced by an administrator to determine the risk score, may combine a score produced using the customized heuristic process with a score determined by the risk scoring module to determine the risk score, or may determine a risk score based on its own determination.

Figure 6:
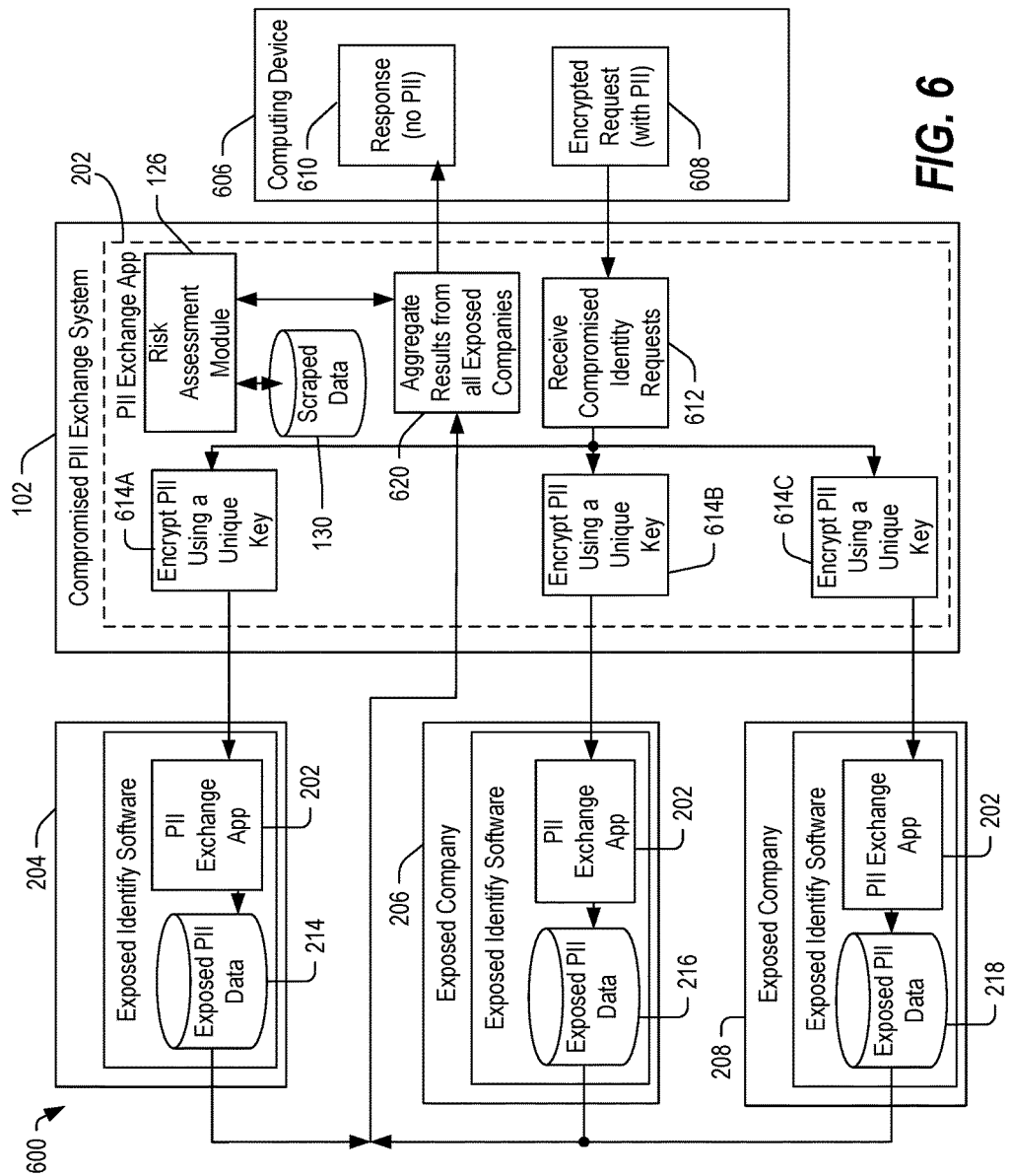
FIG. 6 depicts a block diagram of a compromised identity exchange system including distributed data sources, in accordance with certain embodiments of the present disclosure.

Referring now to FIG. 6, a system 600 is shown that includes exposed entities 204, 206, and 208 configured to communicate with a compromised PII exchange system 102, which is configured to communicate with a computing device 606. In some embodiments, the computing device 606 may be operated by an end user. In certain embodiments, a user may interact with the compromised PII exchange system 102 to verify that his/her PII data has not been compromised.

In certain embodiments, a user may interact with the computing device 606 to access an Internet browser application through which the user may visit web page hosted by the compromised PII exchange system 102. The user may enter his or her PII data in the web page and submit the PII data securely as an encrypted request 608 to the compromised PII exchange system 102.

In certain embodiments, the compromised PII exchange system 102 may unencrypt the compromised identity requests at 612, and may re-encrypt the PII using unique keys at 614A, 614B, and 614C for transmission to the exposed companies 204, 206, and 208, respectively.

The PII exchange application 202 at each exposed entity 204, 206, and 208 may compare the PII data to its exposed PII data 214, 216, and 218. In certain embodiments, at each exposed entity 204, 206, and 208, the PII exchange application 202 may unencrypt the PII data and re-encrypt the PII data with keys that correspond to the keys used to encrypt the data in the exposed PII data 214, 216, and 218. The PII exchange application 202 at each of the exposed companies 204, 206, and 208 may then search the exposed PII data 214, 216, and 218 to identify a match and may return data corresponding to the comparison to the compromised PII data exchange 102.

In this example, the risk assessment module 126 and the scraped data 130 may be included within the PII exchange application 202 at the compromised PII exchange system 102. In this embodiment, each of the PII exchange applications 202 at each of the exposed entities 204, 206, and 208 may include a risk assessment module 126 that may communicate with the scraped data 130, which may be stored at the compromised PII exchange system 102.

In some embodiments, in response to receiving PII data at the compromised PII exchange system 102 from a computing device 606, the PII application 202 may encrypt the PII data and send the encrypted data to the exposed companies 204, 206, and 208. Further, the PII application 202 may use the risk assessment module 126 to update the encoded PII data 214, 216, and 218; to update another database; to compare the received PII data to the scraped data 130; or any combination thereof. Further, the exposed companies 204, 206, and 208 may search their respective exposed PII data 214, 216, and 218 and may report the results to the compromised PII exchange system 102, which may aggregate the results together with the results from the risk assessment module 126 and which may report the response (without PII data) to the requesting computing device 606.

In some embodiments, one or more of the exposed companies 204, 206, and 208 may also act as the computing device 606 to send the PII data to the compromised PII exchange system 102 for a risk assessment that crosses multiple entities. By providing an exchange that allows for verification of use of such exposed PII data, companies may have the ability to validate risk across multiple entities and without exposing the PII data to their competitors. Further, by comparing the PII data to scraped data 130, detection of the exposure on various websites can be used to elevate the potential risk assessment score to enable an at-risk company to perform an elevated evaluation for extending credit or allowing an account takeover, for example.

In certain embodiments, the compromised PII data exchange 102 may aggregate the results from all of the exposed companies 620 and from the risk assessment module 126 and may provide results (response with no PII data) 610 to the computing device 606. In certain embodiments, the compromised PII exchange system 102 may analyze the aggregate data and the data from the risk assessment module 126 to assess the risk and may provide a report including a risk assessment score to the computing device 606. Other embodiments are also possible.

Figure 7:
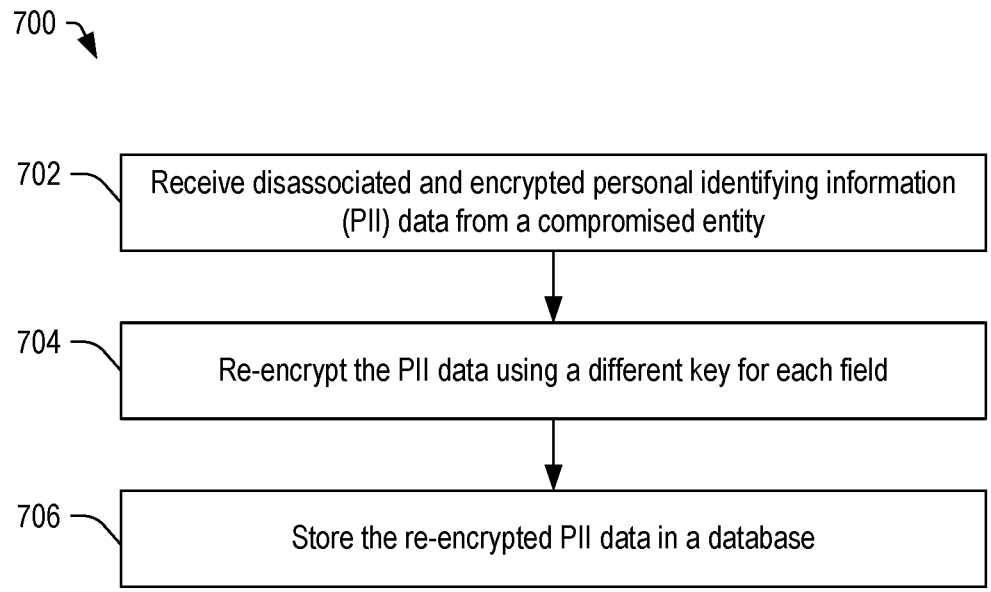
FIG. 7 depicts a flow diagram of a method of exchanging compromised identity data, in accordance with certain embodiments of the present disclosure.

FIG. 7 is a flow diagram of a method 700 of exchanging compromised identity data, in accordance with certain embodiments of the present disclosure. At 702, the method 700 may include receiving disassociated and encrypted PII data from a compromised entity. The method 700 may further include re-encrypting the PII data using a different key for each field, at 704. The method 700 may also include storing the re-encrypted PII data in a database, at 706.

In certain embodiments, each field of the encrypted PII data may be stored with an exposure event identifier and with a unique identifier. In certain embodiments, data about the exposure event may be collected over time, and the identification of a match between PII data and data stored in the database may retrieve the matching data and the event identifier. A risk assessment may be determined, in part, based on facts relating to the exposure event. As discussed above, a large data breach may reduce the chance that a particular piece of information is being misused, while a smaller data breach may enhance the statistical probability. Further, in some embodiments, if the event was a lost laptop or other personal item, the probability may be impacted by the circumstances as well as the subsequent recovery or failure to recover the device. Over time, as data about the breach is collected, such data may be stored and used to evaluate particular matches in the data set.

Further, in some embodiments, the unique identifier stored with each field may be stored in a database, for example, at a remote location or with the data source (e.g., the compromised company that sent the data). Subsequently, the unique identifiers may be used to reassemble the PII data for a single individual (for example) from the disassociated PII data. This will only be possible if the compromised company keeps a mapping between the unique ID's of each identity element and the overall identity. Other embodiments are also possible.

Figure 8:
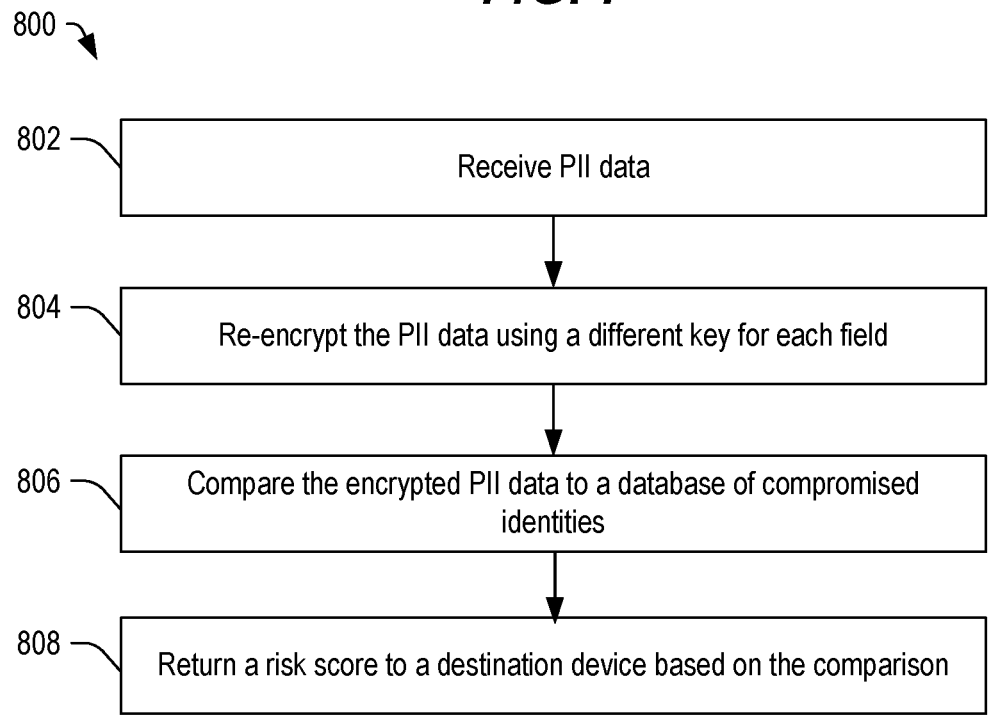
FIG. 8 depicts a flow diagram of a method determining a risk based on compromised data, in accordance with certain embodiments of the present disclosure.

FIG. 8 is a flow diagram of a method 800 of a method of exchanging compromised identity data, in accordance with certain embodiments of the present disclosure. At 802, the method 800 may include receiving PII data from a source. In some embodiments, the source may be an at-risk entity, a consumer, or another entity.

At 804, the method 800 may include re-encrypting the PII data using a different key for each field. In certain embodiments, the PII data may be unencrypted first and then re-encrypted using keys corresponding to those used to encrypt data in a particular database. In some embodiments, the PII data may be duplicated and separately encrypted for transmission to PII exchange applications at one or more compromised companies.

At 806, the method 800 may include comparing the encrypted PII data to a database of compromised identities. In certain embodiments, the re-encrypted PII data is compared to the data in the database locally. Further, the PII data (in encrypted form) may be sent to the compromised entities for comparison with their local data using the PII exchange applications on their systems. The method 800 may also include comparing the encrypted PII data to a database of scraped data, which may be similarly encrypted to identify potential matches.

At 808, the method 800 may include returning a risk score to a destination device based on the comparison. The risk score may be based both on a comparison to the database of compromised identities and on a comparison to the database of scraped data. In certain embodiments, the results from the comparisons (whether from the local PII database or from the compromised companies) may be aggregated and analyzed to determine the risk score. The aggregation may include the results from the comparison to the scraped data. In certain embodiments, the risk score may be based on a variety of data, including data about the breach event, data about the field that was matched (i.e., date of birth versus social security number), data about the frequency of the match (i.e., has this data been matched previously), data about other recent matches, and so on. Based on the data, a risk score may be calculated that can reflect the probability that a particular piece of consumer data may be misused. The information may be provided to the requesting company or individual, and the information may be used to make informed decisions with respect to credit applications and other decisions.

Figure 9:
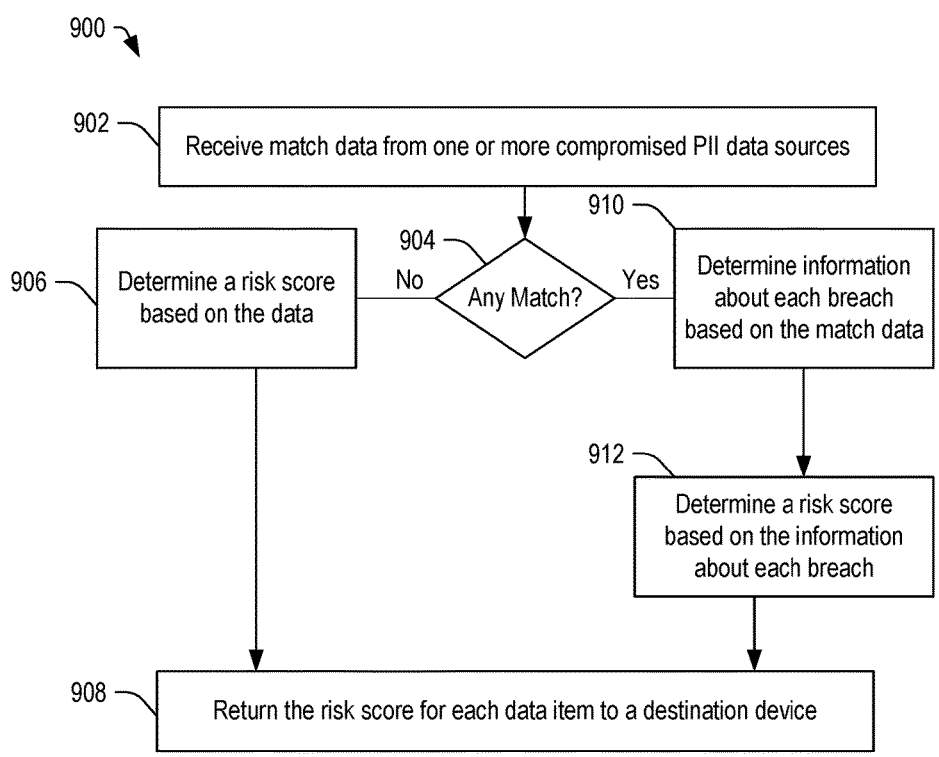
FIG. 9 depicts a flow diagram of a method of determining a risk score, in accordance with certain embodiments of the present disclosure.

FIG. 9 depicts a flow diagram of a method 900 of determining a risk score, in accordance with certain embodiments of the present disclosure. At 902, the method 900 includes receiving match data from one or more compromised PII data sources. The match data may include a breach identifier or a risk score associated with a particular breach or piece of data.

At 904, the method 900 includes determining if there are any matches. If not, the method 900 includes determining a low risk score based on the data, at 906. If there is a match at 904, the method 900 advances to 910 to determine information about each breach based on the match data. In some embodiments, the information about each breach may include a risk score reflecting multiple matches between the compromised PII data of a particular breach or data exposure event and data scraped from one or more web pages or other sources (e.g., from "dark" websites that cannot be accessed from indexed search engines). The method 900 may further include determining a risk score based on the information about each breach.

In certain embodiments, a piece of data may begin with a predetermined score, and each match may cause the system to deduct from the score. The deductions for each match may vary based on the severity of the breach that resulted in the data becoming compromised.

In certain embodiments, the deduction may be based on a received risk score, such that subsequent fraud events detected by one or more of the data sources may cause the risk score from that particular data source to be escalated. The received risk score may then be subtracted from the predetermined risk score to produce an aggregated score for that data item. In certain embodiments, reported fraud data, information about the data, and information about the breach may be used to develop a probabilistic score that can rank order the risk associated with a consumer and a certain event, which score may be used to assess risk with respect to a particular piece of data.

Once the risk score is determined (at 906 or 912), the method 900 may include returning the risk score for each data item to a destination device. In some embodiments, the risk score may represent a statistical likelihood that the data item has been compromised and may be (or have been) misused.

In some embodiments, the data returned may include a risk assessment score based on the results of the comparison. For example, if the data corresponds to PII data that has previously been identified in a fraudulent transaction, or that the compromised entity data breach is actively being used in fraudulent ways, the risk assessment score may be high. In another example, if the data results correspond to a low-risk event (such as a lost laptop computer) or an older event with no known harm, the risk assessment score may be lower. Each compromised PII data source may have different data points from which to determine a risk score. The resulting risk score data that is received by the data exchange may be aggregated to determine a composite risk score for each data item, and the composite score may be sent to the destination device.

Figure 10:
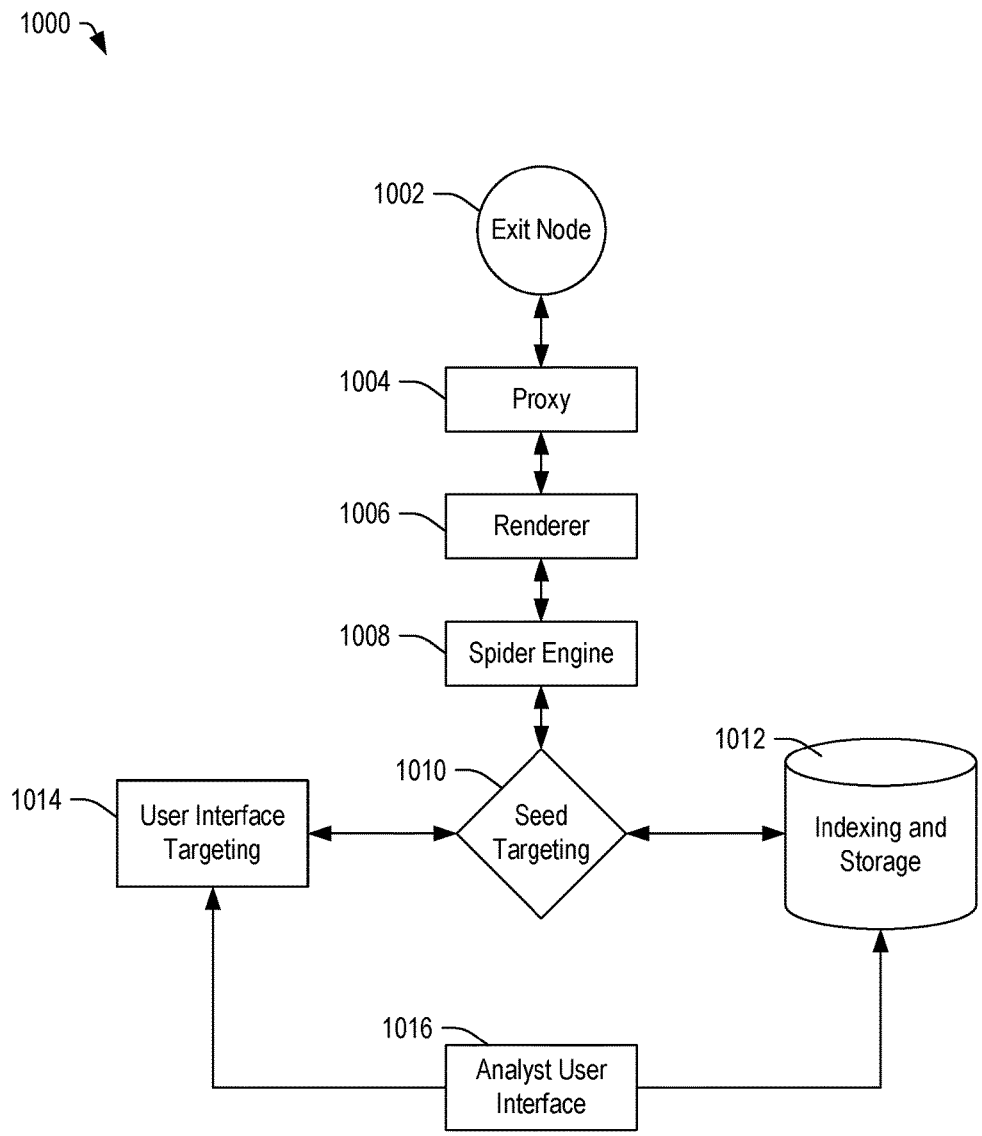
FIG. 10 depicts a conceptual diagram of a crawler application, in accordance with certain embodiments of the present disclosure.

FIG. 10 depicts a conceptual diagram of a crawler application 1000, in accordance with certain embodiments of the present disclosure. The crawler application 1000 may be an embodiment of the crawler 128 of FIG. 1. The crawler 1000 may utilize various open source licensed technologies, such as Berkeley Software Distribution (BSD) Licensed technologies. Such open source technologies can include various tools and frameworks, such as the Scrapy framework from www.scrapy.org, Splash (a lightweight Internet browser capable of processing multiple pages in parallel and capable of executing JavaScripts in the page context), the Tor browser from the Tor Project, the Elasticsearch search engine powered by Lucene, high powered Python web frameworks, such as Django, open source relational database management systems, such as PostgreSQL, and other data processing and storage frameworks.

The crawler 1000 may be configured to utilize an exit node, which is a gateway where encrypted traffic can enter the Internet anonymously. The crawler 100 utilizes a proxy for access to onion routing sites, such that the proxy disguises the origin of data requests by redirecting traffic on behalf of the crawler 1000. The crawler 1000 may also utilize a renderer 1006, such as a JavaScript rendering engine, which may be configured to access web pages, interact with various authentication protocols of such websites by providing credentials, and scrape data. Depending on the spider engine 1008 and the targeted site, the targeted site may or may not be engaged for the crawl. The renderer 1006 allows the crawler to interact with the target site by entering credentials for access.

In some embodiments, an analyst may access a user interface 1016 to enters or upload a list of URLs into the targeting interfaces 1014. The URLs can be rendered in list format on a seed targeting page 1010. The spider engine 1008 can then gather information from the web pages corresponding to the seed lists. The spider scripts or code executed by the spider engine 1008 can scrape (extract, transform, and load) information from each targeted web page into an indexing and storage database 1012. The indexing and storage database 1012 may be an embodiment of the scraped data 130 in FIGS. 1-6

In certain embodiments, individual scripts may be developed for the spider engine 1008 for broad or targeted crawls. Targeted crawls may include analyst provided credentials. Both broad and targeted crawls can engage standard XML libraries to extract text and then push crawled html documents into an indexing engine for indexing and storage in the database 1012. In some embodiments, an analyst may use the interface to check results of crawls and to update target lists of URLs. Further, the database 1012 can be searched using various discovery tools and may be used for automated comparisons by the risk assessment module 126.

Figure 11:
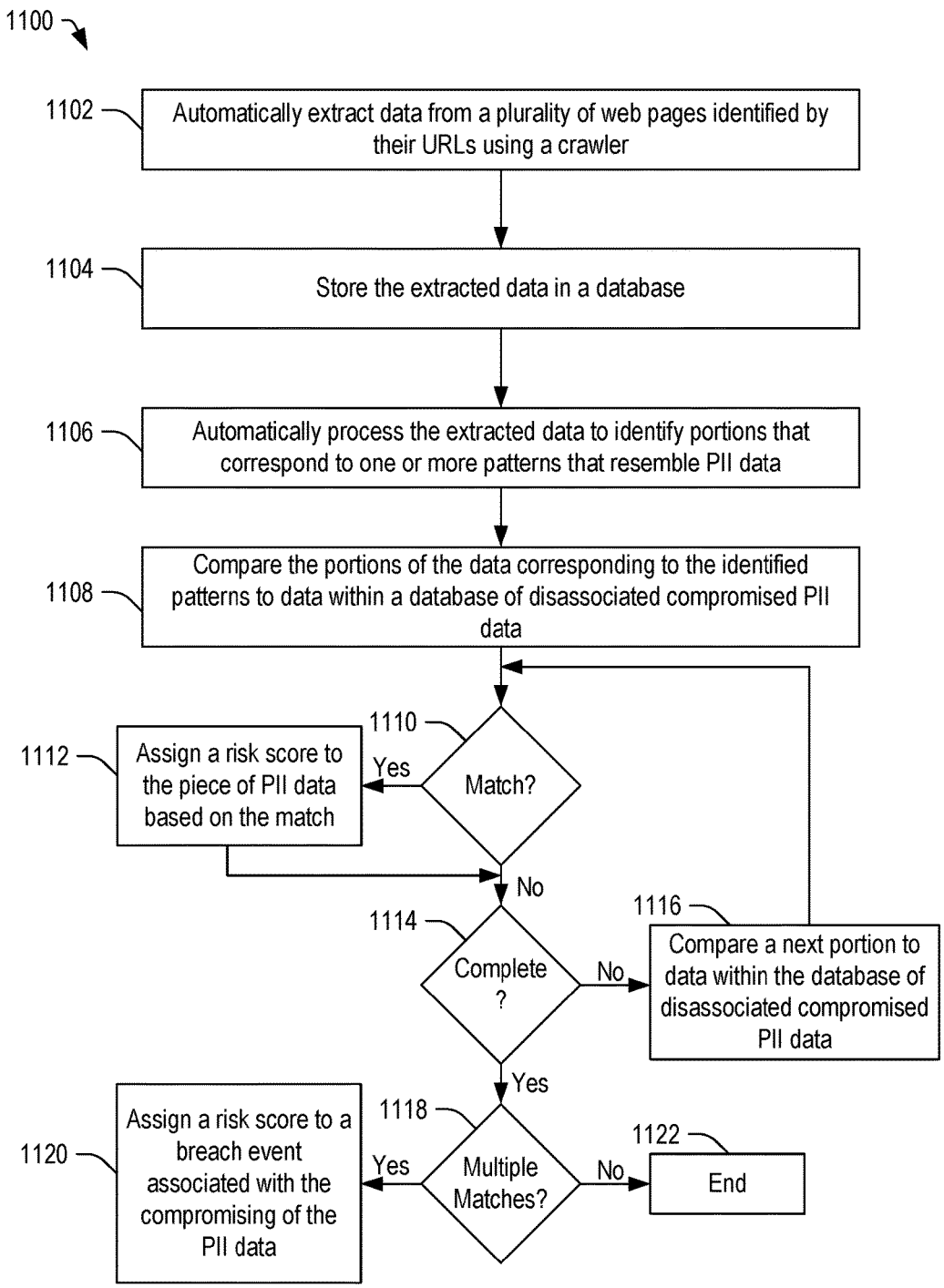
FIG. 11 illustrates a flow diagram of a method of determining a risk score based on a correspondence between compromised data and data retrieved from a web site, in accordance with certain embodiments of the present disclosure.

FIG. 11 illustrates a flow diagram of a method 1100 of determining a risk score based on a correspondence between compromised data and data retrieved from a web site, in accordance with certain embodiments of the present disclosure. The method 1100 may include automatically extracting data from a plurality of web pages identified by their URLs using a crawler. The URLs may be provided by an administrator, stored in a list, or both. At 1104, the method 1100 may include storing the extracted data in a database. In some embodiments, the crawler may utilize an indexing and storage application to extract, transform, load, index, and store the data into a database of scraped data.

At 1106, the method 1100 may include automatically processing the extracted data to identify portions that correspond to one or more patterns that resemble PII data. The patterns may include particular patterns of numbers (e.g., 9-digit numbers, 10-digit numbers, and so on), particular arrangements of letters and punctuation, particular arrangements of letter and numbers, or any combination thereof.

At 1108, the method 1100 can include comparing the portions of the data corresponding to the identified patterns to data within a database of disassociated compromised PII data. At 1110, if there is a match, the method 1100 may include assigning a risk score to the piece of PII data based on the match, at 1112. The risk score may reflect an elevated risk based on the match. The method 1100 may then determine if there are more portions to compare. If, at 1114, the comparison process is not complete, the method 1100 may include comparing a next portion of the disassociated data to data within the database of disassociated compromised PII data, at 1116. The method 1100 returns to 1110 to determine if there is a match.

Returning to 1110, if there is no match, the method 1100 may then determine if there are more portions to compare. If, at 1114, the comparison process is not complete, the method 1100 may include comparing a next portion of the disassociated data to data within the database of disassociated compromised PII data, at 1116. The method 1100 returns to 1110 to determine if there is a match.

Otherwise, at 1114, if there are no more portions, the method 1100 may include determining if multiple matches were identified within the data, at 1118. If not, the method 1100 may terminate, at 1122. Otherwise, if so, the method 1100 may include assigning a risk score to a breach event (or compromise event) associated with the compromising of the PII data. By assigning a risk score to the event, each data item associated with the breach event may be automatically assigned an elevated risk score because multiple PII data items associated with the breach event have been discovered on a website, suggesting that the compromise or exposure event was not than benign.

Figure 12:
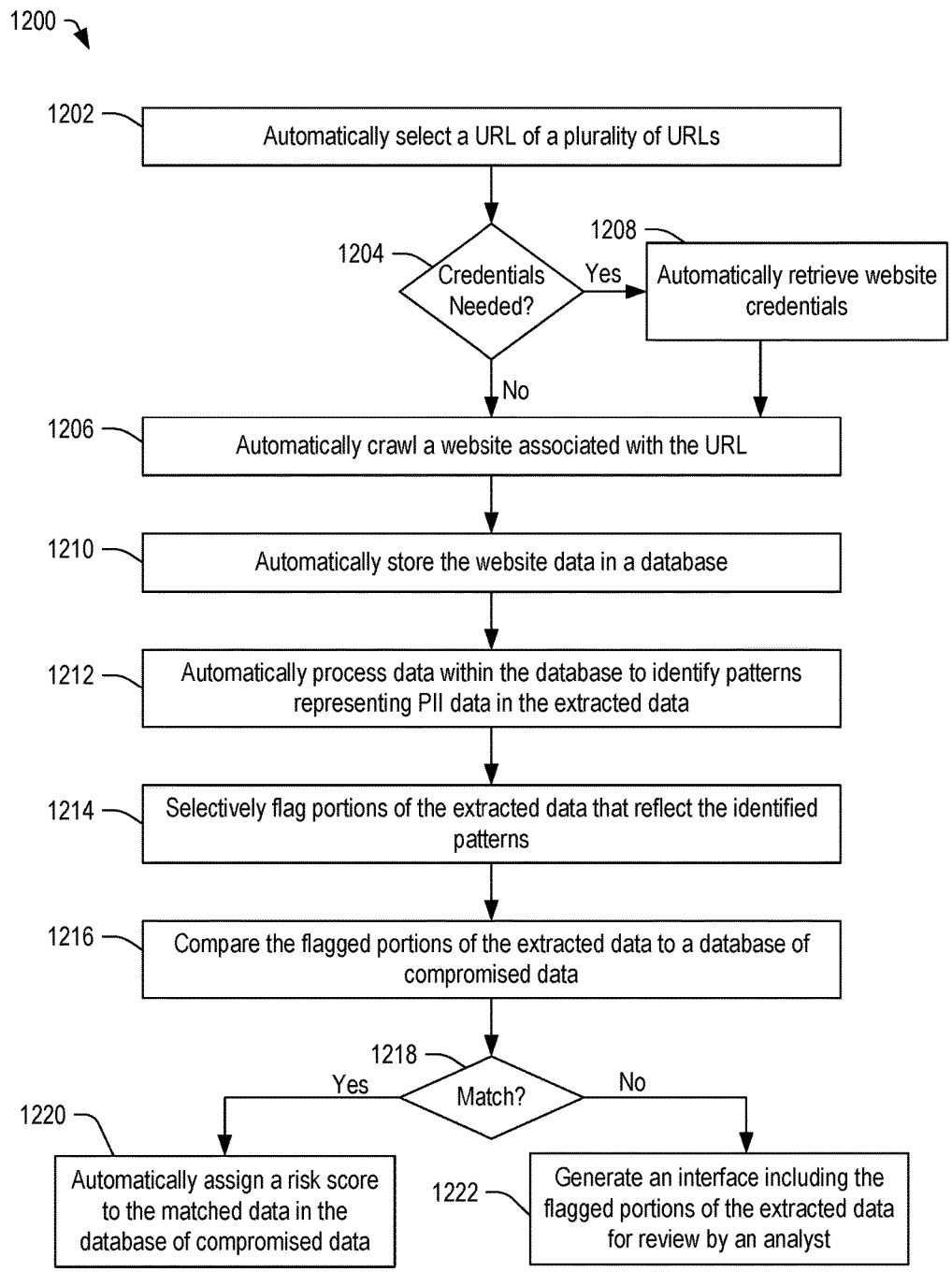
FIG. 12 illustrates a flow diagram of a method of determining a risk score based on a correspondence between compromised data and data retrieved from a web site, in accordance with certain embodiments of the present disclosure.

FIG. 12 illustrates a flow diagram of a method 1200 of determining a risk score based on a correspondence between compromised data and data retrieved from a web site, in accordance with certain embodiments of the present disclosure. At 1202, the method 1200 may include automatically selecting a URL of a plurality of URLs. The plurality of URLs may be stored in a file or database, provided by an administrator, or both. At 1204, if credentials are not needed, the method 1200 may include automatically crawling the website associated with the URL, at 1206. Otherwise, at 1204, if credentials are needed, the method 1200 may include automatically retrieve website credentials and log in, at 1208. As discussed above, the crawler may include multiple spider applications, which may be used in conjunction with a rendering engine to visit and scrape data from web pages.

At 1210, the method 1200 can include automatically storing the website data in a database. In some embodiments, the crawler may provide the scraped data to an indexing and storage module, which may store the data in a database, such as the scraped data 130. At 1212, the method 1200 may include automatically processing the data within the database to identify patterns representing PII data in the extracted data.

At 1214, the method 1200 can include selectively flagging (marking or otherwise isolating) portions of the extracted data that reflect the identified patterns. In some embodiments, flagging the portions may include copying the portions to a temporary table for further processing.

At 1216, the method 1200 can include comparing the flagged portions to data within a database of compromised data. In an example, the flagged portions may be encrypted and compared to encrypted, disassociated compromised PII data within a database to determine if the compromised data has been exposed on a website.

At 1218, if a match is found, the method 1200 may include automatically assigning a risk score to the matched data in the database of compromised data, at 1220. In an example, an existing risk score associated with the matched data may be updated to reflect the new match. At 1218, if a match is not found, the method 1200 may include generating an interface including the flagged portion of the extracted data for review by an analyst, at 1222. The interface may be presented within an analyst application, within a web browser, or in another way.

In general, the systems, methods, and processes described above with respect to FIGS. 1-12 describe a method of detecting exposure of compromised PII data by looking for data patterns, rather than looking for specific introductory words or terms. As a result, the analytics of the above-described systems can identify exposed PII data even when the data formatting is altered to disguise the content, making this form of detection significantly more robust that conventional systems, which may rely on a particular nomenclature for identifying such exposed data, since the nomenclature can be readily changed to elude detection.

In conjunction with the systems, methods and devices described above with respect to FIGS. 1-12, a compromised PII exchange system may include a risk assessment module configured to scrape data from various websites identified by a list of URLs, identify portions of the scraped data that have patterns that resemble PII data, and flag those portions for further processing. The risk assessment module may be configured to search a database of disassociated compromised PII data using the portions of the scraped data to determine matches and to update a risk score associated with any matched data within the database to reflect an increased risk based on discovery of that data on a website. In some embodiments, the risk assessment module may be configured to determine a webpage rank associated with detected PII data and may provide an interface including the PII data to a computing device associated with an administrator. The administrator may interact with the interface to produce a customized heuristic process that may be utilized by the risk assessment module to determine the risk score. Other embodiments are also possible.

The processes, machines, and manufactures (and improvements thereof) described herein are particularly useful improvements for companies and systems that utilize PII data. Further, the embodiments and examples herein provide improvements in the technology of data security and computer-based risk assessment systems. In addition, embodiments and examples herein provide improvements to the functioning of a computer by providing a secure PII exchange system that allows at-risk companies and consumers to determine the risk associated with particular PII data, thereby creating a specific purpose computer by adding such technology. Further, embodiments and examples herein provide improvements to the functioning of a computer by crawling web pages based on their URLs to identify patterns of data that resemble PII data in order to compare those portions of the data to compromised data in order to further evaluate a risk associated with relying on such data.

Thus, the improvements herein provide for technical advantages, such as providing a system through which a compromised company (a company that has exposed PII data either inadvertently or through a hack or other data breach event) may share access to its exposed data in a form that cannot be misappropriated. Further, the improvements herein provide for technical advantages in that other companies may utilize such data as well as the risk determinations based on potential discovery of such data on the Internet to make their own assessments of risk for extending credit, authorizing account access, and so on. For example, the systems and processes described herein can be particularly useful to any company offering services (including financial services) or that maintains customer information, including those that maintain customer accounts that could be compromised based on data acquired from a data exposure event. Further, the improvements herein provide additional technical advantages, such as providing a system in which the PII data is disassociated, and each field of the PII data is separately encrypted using a different encryption key, providing a secure data store of unlinked data elements such that a single PII data record cannot be re-assembled from the disassociated data. Further, the encrypted and disassociated data can be searched using similarly encrypted and disassociated data to identify potential matches, which matches may indicate a possible risk due to the exposure of the data. While technical fields, descriptions, improvements, and advantages are discussed herein, these are not exhaustive and the embodiments and examples provided herein can apply to other technical fields, can provide further technical advantages, can provide for improvements to other technologies, and can provide other benefits to technology. Further, each of the embodiments and examples may include any one or more improvements, benefits and advantages presented herein.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in the flow diagrams presented herein, in certain embodiments, blocks may be removed or combined without departing from the scope of the disclosure. Further, structural and functional elements within the diagram may be combined, in certain embodiments, without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A compromised data exchange system comprises:
an interface configured to couple to a network;
a processor coupled to the interface; and
a database of disassociated compromised PII data, the database including items of PII data that are disassociated from one another such that PII data of a particular individual cannot be reassembled from the data in the database;

a memory accessible to the processor and storing instructions that, when executed, cause the processor to:
  extract data from one or more websites using a crawler;
  detect portions within the data that resemble personally identifying information (PII) data based on PII data patterns using a risk assessment module;
  compare a detected portion to data within the database of disassociated compromised PII data to determine a match using the risk assessment module; and
  selectively assign a risk score to a data item within the database in response to determining the match using a risk scoring module.

2. The compromised data exchange system of claim 1, wherein the crawler comprises:
  at least one script configured to interact with a selected one of the one or more websites;
  a rendering engine configured to render the at least one script to access the selected one of the one or more websites to extract the data; and
  wherein the crawler is configured to index and store the extracted data in a database of scraped data.

3. The compromised data exchange system of claim 2, wherein the crawler is configured to retrieve and apply credentials for the selected one of the one or more websites to gain access to the data.

4. The compromised data exchange system of claim 1, wherein the memory further includes instructions that, when executed, cause the processor to:
  determine webpage rankings for each of the one or more websites in response to detecting the portions within the data that resemble the PII data; and
  determine the risk score at least in part based on the webpage ranking of a webpage from which the PII data was extracted.

5. The compromised data exchange system of claim 1, wherein the instructions that cause the processor to detect portions within the data further include instructions that, when executed, cause the processor to:
  process the extracted data to identify portions that include patterns of numbers resembling at least one of a social security number, a phone number, a birth date, a driver's license number, and an account number; and
  flag the identified portions for further processing.

6. The compromised data exchange system of claim 1, wherein the instructions that cause the processor to detect portions within the data further include instructions that, when executed, cause the processor to:
  encrypt each of the portions according tan encryption applied to data within the database of disassociated compromised PII data; and
  compare each of the encrypted portions to data within the database of disassociated compromised PII data to determine the match.

7. The compromised data exchange system of claim 1, wherein the instructions that cause the processor to selectively assign the risk score include instructions that, when executed, cause the processor to increase a risk score for a piece of disassociated data within the database of disassociated compromised PII data in response to determining the match.

8. The compromised data exchange system of claim 1, wherein the instructions that cause the processor to selectively assign the risk score include instructions that, when executed, cause the processor to assign a risk score to each piece of disassociated data within the database of disassociated compromised PII data associated with a particular data breach event in response to determining multiple matches between the portions and the disassociated data.

9. A computer-readable memory device including instructions that, when executed, cause a processor to:
  extract data from one or more websites using a crawler;
  detect portions within the data that resemble personally identifying information (PII) data based on PII data patterns using a risk assessment module;
  compare a detected portion to data within a database of disassociated compromised PII data to determine a match using the risk assessment module, the database including items of PII data that are disassociated from one another such that PII data of a particular individual cannot be reassembled from the data in the database; and
  selectively assign a risk score to a data item within the database in response to determining the match using a risk scoring module.

10. The computer-readable memory device of claim 9, further including instructions that, when executed, cause the processor to send data corresponding to the risk score to the computing device.

11. The computer-readable memory device of claim 9, further including instructions that, when executed, cause the processor to:
  select at least one script configured to interact with a selected one of the one or more websites;
  render the at least one script using a rendering engine to access the selected one of the one or more websites to extract the data; and
  index and store the extracted data in a database of scraped data.

12. The computer-readable memory device of claim 11, further including instructions that, when executed, cause the processor to retrieve and apply credentials for the selected one of the one or more websites to gain access to the data.

13. The computer-readable memory device of claim 11, further including instructions that, when executed, cause the processor to increase a risk score for a piece of disassociated data within the database of disassociated compromised PII data in response to determining the match.

14. The computer-readable memory device of claim 9, further including instructions that, when executed, cause the processor to:
  process the extracted data to identify portions that include patterns of numbers resembling at least one of a social security number, a phone number, a birth date, a driver's license number, and an account number; and
  flag the identified portions for further processing.

15. The computer-readable memory device of claim 9, further including instructions that, when executed, cause the processor to:
  encrypt each of the portions according tan encryption applied to data within the database of disassociated compromised PII data; and
  compare each of the encrypted portions to data within the database of disassociated compromised PII data to determine the match.

16. The computer-readable memory device of claim 9, wherein the instructions that cause the processor to selectively assign the risk score further include instructions that, when executed, cause the processor to increase a risk score for a piece of disassociated data within the database of disassociated compromised PII data in response to determining the match.

17. The computer-readable memory device of claim 9, wherein the instructions that cause the processor to selectively assign the risk score further include instructions that, when executed, cause the processor to assign a risk score to each piece of disassociated data within the database of disassociated compromised PII data associated with a particular data breach event in response to determining multiple matches between the portions and the disassociated data.

18. The computer-readable memory device of claim 9, further including instructions that, when executed, may cause the processor to:
- determine webpage rankings for each of the one or more websites in response to detecting the portions within the data that resemble the PII data; and
- determine the risk score at least in part based on the webpage ranking of a webpage from which the PII data was extracted.

19. A compromised data exchange system comprises:
- an interface configured to communicate with a network;
- a processor coupled to the interface;
- a database of disassociated compromised PII data, the database including items of PII data that are disassociated from one another such that PII data of a particular individual cannot be reassembled from the data in the database; and
- a memory accessible to the processor and configured to store instructions that, when executed, cause the processor to:
  - retrieve data from one or more websites according to a list of uniform resource locators (URLs);
  - process the retrieved data to identify portions that correspond to patterns that resemble personally identifying information (PII) data;
  - compare the identified portions to data stored in the database of compromised PII data to determine a match; and
  - update a risk score associated with a matching data item within the database of compromised PII data in response to determining the match.

20. The compromised data exchange system of claim 19, wherein the instructions that cause the processor to process the retrieve data further include instructions that, when executed, cause the processor to identify at least one of patterns of numbers, patterns of text and punctuation, patterns of numbers and text that resemble PII data.

21. The compromised data exchange system of claim 19, wherein the instructions that cause the processor to update the risk score include instructions that cause the processor to assign a risk score associated with a breach event to each data item within the database of compromised PII data that corresponds to the breach event in response to determining multiple matches.

* * * * *